(12) United States Patent
Moore et al.

(10) Patent No.: US 11,111,378 B2
(45) Date of Patent: Sep. 7, 2021

(54) BULK TRANSIENT MATERIALS MADE OF CYCLIC POLY(PHTHALALDEHYDE)

(71) Applicant: The Board of Trustees of the University of Illinois, Urbana, IL (US)

(72) Inventors: Jeffrey S. Moore, Savoy, IL (US);
Scott R. White, Champaign, IL (US);
Nancy R. Sottos, Champaign, IL (US);
Adam M. Feinberg, Urbana, IL (US);
Christopher L. Plantz, Urbana, IL (US); Hector Lopez-Hernandez, Urbana, IL (US); Evan M. Lloyd, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 151 days.

(21) Appl. No.: 16/383,316

(22) Filed: Apr. 12, 2019

(65) Prior Publication Data

US 2019/0315961 A1    Oct. 17, 2019

Related U.S. Application Data

(60) Provisional application No. 62/658,091, filed on Apr. 16, 2018.

(51) Int. Cl.
*C08L 61/02* (2006.01)
*C08K 5/12* (2006.01)
(Continued)

(52) U.S. Cl.
CPC ............ *C08L 61/02* (2013.01); *C08J 5/18* (2013.01); *C08K 5/005* (2013.01); *C08K 5/0016* (2013.01); *C08K 5/06* (2013.01); *C08K 5/12* (2013.01); *C08K 5/18* (2013.01); *C08K 5/3432* (2013.01); *B01J 27/10* (2013.01); *B01J 27/135* (2013.01); *B01J 27/138* (2013.01);
(Continued)

(58) Field of Classification Search
CPC .. C08L 61/02; C08L 2201/06; C08L 2201/08; C08L 2203/16; C08L 2203/30; C08K 5/12; C08K 5/005; C08K 5/05; C08K 5/17; C08K 5/18; C08K 3/011; C08K 3/014; C08K 3/012; C08K 5/0016; C08K 5/0025; C08K 5/0033; C08J 5/18; C08J 5/04

See application file for complete search history.

(56) References Cited

U.S. PATENT DOCUMENTS

2018/0155483 A1*  6/2018  Kohl ................... B32B 27/42
2020/0283594 A1*  9/2020  Sottos ................. C08G 61/02

OTHER PUBLICATIONS

Feinberg, Elizabeth et al., "Cyclic Poly(phthalaldehyde): Thermoforming a Bulk Transient Material", ACS Macro Lett., 2018, 7, 47-52. Published online Dec. 15, 2017 (Year: 2017).*

(Continued)

*Primary Examiner* — Jane L Stanley
(74) *Attorney, Agent, or Firm* — Crowell & Moring LLP

(57) ABSTRACT

The present disclosure provides a composition of matter comprising purified cyclic poly(phthalaldehyde) (cPPA) and a plasticizer. The composition enables thermal processing and molding in bulk quantities, and is designed to degrade when contacted by an acid or exposed to a high enough temperature. Photodegradable cPPA containing a photooxidant is disclosed. Methods of making and recycling the composition of matter are also provided.

20 Claims, 24 Drawing Sheets

(51) Int. Cl.
| | |
|---|---|
| C08K 5/06 | (2006.01) |
| C08K 5/00 | (2006.01) |
| C08K 5/18 | (2006.01) |
| C08K 5/3432 | (2006.01) |
| C08J 5/18 | (2006.01) |
| B01J 27/138 | (2006.01) |
| B01J 27/135 | (2006.01) |
| B01J 27/10 | (2006.01) |

(52) U.S. Cl.
CPC ....... C08L 2201/08 (2013.01); C08L 2203/16 (2013.01); C08L 2203/30 (2013.01)

(56) References Cited

OTHER PUBLICATIONS

Lloyd, Evan et al. "Fully Recyclable Metastable Polymers and Composites", Chem. Mater., 2019, 31, 398-406. Published online Dec. 31, 2018. (Year: 2018).*

Hernandes, Hector Lopez et al "Accelerated Thermal Depolymerization of Cyclic Polyphthalaldehyde with a Polymeric Thermoacid Generator", Macromolecular Rapid Communications, 2018, 39, 1800046. Published online Apr. 30, 2018 (Year: 2018).*

Wang, Feng et al. "Polyphthalaldehyde: Synthesis, Derivatives, and Applications", Macromolecular Rapid Communications, 2018, 39, 1700519. Published online Nov. 6, 2017 (Year: 2017).*

Aso, Chuji, et al., "Polymerization of Aromatic Aldehydes, III. The Cyclopolymerization of Phthalaldehyde and the Structure of the Polymer", Department of Organic Synthesis, Faculty of Engineering, Kyushu University, Fukuoka, 812, Japan, May 15, 1969.

Aso, Chuji et al., "Polymerization of Aromatic Aldehydes, II. Cationic Cyclopolymerization of Phtnalaldehyde", Journal of Polymer Science, Parrt A-1, vol. 7, 497-511 (1969).

Diesendruck, Charles E. et al., "Mechanically Triggered heterolytic unzipping of a low-ceiling-temperature polymer", Nature Chemistry, Articles, Published Online Apr. 28, 2014, DOI:10.10.38/NCHEM1938.

DiLauro, Anthony M., et al., "Reproducible and Scalable Synthesis of End-Cap-Functionalized Depolymerizable Poly(phthalaldehydes)", Macromolecules, ACS Publications, 2013 American Chemical Society.

Fayolle, B. et al., "Thermooxidative Ageing of Polyoxymethylene, Part 1: Chemical Aspects", Journal of Applied Polymer Science, vol. 107, 1783-1792, (2008).

Gourdin, Gerald et al. "Phototriggerable, Fully Transient Electronics: Component and Device Fabrication", 2017 IEEE 67th Electronic Components and Technology Conference.

Hernandez, Hector Lopez, et al., "Triggered Transience of Metastable Poly(phthalaldehyde) for Transient Electronics", Advanced Materials, 2014, 26, 7637-742.

Ito, Hiroshi et al., "Chemical Amplification Based on Acid-Catalyzed Depolymerization", Journal of Photopolymer Science and Technology, vol. 3, No. 3 (1990) 219-233.

Ito, Hiroshi et al., "Thermally Developable, Positive Resist Systems with High Sensitivity", IBM Research Division, Almaden Research Center, San Juan, California.

Ito, Hiroshi et al., "Chemical Amplification in the Design of Dry Developing Resist Materials", IBM Research Laboratory, San Jose, California, Poly Eng. & Sci, Dec. 1983.

Ito, Hiroshi et al., "Highly sensitive thermally developable positive resist systems" IBM Research Division, Almaden Research Center, San Jose, California, J. VacSci. Technol B, Nov./Dec. 1988.

Kaitz, Joshua A., et al., "Copolymerization of o-Phthalaldehyde and Ethyl Glyoxylate: Cyclic Macromolecules with Alternating Sequence and Tunable Thermal Properties", Macromolecules, ACS Publications 2014 American Chemical Sociate.

Kaitz, Joshua A. et al., "End Group Characterization of Poly(phthalaldehyde): Surprising Discovery of a Reversible, Cationic Macrocyclization Mechanism" Journal of the American Chemical Society, Aug. 7, 2013.

Kostler, Stefan et al., Amphiphilic Block Copolymers Containing Thermally Degradable Poly(phthalaldehyde) Blocks, Published in Wiley InterScience (www.intersciences.wiley.com), accepted Dec. 2, 2008.

Park, Chan Woo, et al "Thermally Triggered Degradation of Transient Electronic Devices", Materials Views, Advanced Materials, 2015, 27, 3783-3788.

Phillips, Oluwadamilola et al., "Phototriggerable Transient Electronics: Materials and Concepts" 2017 IEEE 67th Electronic Components and Technology Conference.

Schwartz Jared M, et al. "Stable, High-Molecular-Weight Poly(Phthalaldehyde)", Journal of Polymer Science, Part A, Polymer Chemistry 2016, 55, 1166-1172.

Seo, Wanji et al., "Patterned Plastics That change Physical Structure in Response to Applied Chemical Signals", JACS Communications, Published on Web Jun. 21, 2010.

Steinmann, Alfred, "Heat Developable Resist for Multilayer Resist Technology", Proceedings of SPIE 0920, Advances in Resist Technology and Processing V, (Jan. 1, 1988) doi: 10.1117/12.968296.

Tsuda, Minoru et al., Chemically Amplified Resists IV. Proton-Catalyzed Degradation Mechanism of Poly(phthalaldehyde), Journal of Photopolymer Science and Technology, vol. 6, No. 4(1993) 491-494.

Tsuda, Minoru, et al., "Acid-Catalyzed Degradation Mechanism of Poly(phthalaldehyde): Unzipping Reaction of Chemical Amplification Resist", Laboratory of Physical Chemistry, Faculty of Pharmaceutical Sciences, Chiba University, Chiba 263, Japan.

Zimmerman, H, et al., "Thermogravimetric Investigations on the Kinetics of Thermal Degradation of Polyoxymethylenes" Thermochimica Acta, 59 (1982)1-8.

Hernandez, Hector Lopez et al., "Processing-dependent mechanical properties of solvent cast cyclic polyphthalaldehyde", Polymer 162 (2019) 29-34 (available online Dec. 13, 2018).

* cited by examiner

BULK TRANSIENT MATERIALS MADE OF CYCLIC POLY(PHTHALALDEHYDE)

RELATED APPLICATIONS

The present patent document claims the benefit of priority under 35 U.S.C. § 119(e) to U.S. Provisional Patent Application No. 62/658,091, filed on Apr. 16, 2018, which is hereby incorporated by reference in its entirety.

STATEMENT REGARDING FEDERALLY SPONSORED RESEARCH OR DEVELOPMENT

This invention was made with government support under FA8650-15-C-7522 awarded by the United States Department of Defense. Support was also provided under FA9550-16-1-0017 and FA9550-15-1-0087 awarded by the Air Force Office of Scientific Research. The government has certain rights in the invention.

TECHNICAL FIELD

The present disclosure is related generally to bulk transient materials and more particularly to a cyclic poly(phthalaldehyde) (cPPA) bulk material, methods of stabilizing cPPA, methods of recycling cPPA, and a photodegradable bulk transient material.

BACKGROUND

Since its first description in 1969, poly(phthalaldehyde) (PPA) has garnered extensive interest due to its rapid depolymerization in response to stimuli such as acid, moderate heat, and mechanochemical activation. PPA depolymerizes rapidly because it has a low ceiling temperature of −42° C., meaning that it is thermodynamically unstable at ambient conditions. Cleavage of the polymer backbone or removal of the end group opens a kinetically viable pathway for chain unzipping into the monomer, oPA. In the 1980s, PPA was primarily investigated for use in lithographic processes, and more recently has been considered as an attractive candidate for a broad range of transient materials, i.e., stimuli-responsive materials that undergo rapid depolymerization in response to a triggering event. Toward this end, multiple studies have described the tailoring of materials properties via telechelic functionalization, end-group functionalization, pendent group modifications, or copolymerization. The high-yield, high molecular weight preparation of PPA by Lewis acid catalysis results in a cyclic polymer (cPPA). The development of cPPA presented a significant materials opportunity, given a more facile synthesis and improved mechanical properties compared to its linear counterpart, while maintaining its innate transient functionality.

The transient nature of the polymer poses two distinct challenges in application. First, the stability and thermal degradation behavior of cPPA varies wildly. Even within a single batch, a range of temperature onsets of depolymerization have been reported, with instances of spontaneous depolymerization under ambient conditions. This unpredictability precludes standardization, and hence impacts the reliability of these materials for transient applications. Second, bulk materials and monolithic form factors based on cPPA remain elusive, with applications and studies of cPPA relegated to those of powders or solvent-cast thin films. The relatively low degradation temperature of cPPA (ca. 100° C.) has precluded thermal processing, as the polymer degrades before any thermal transition, with an estimated $T_g$ of ca. 180° C.

Understanding the degradation behavior of cPPA is complicated by the fact that differing degradation mechanisms have been proposed, suggesting that different pathways are operative under different conditions. Computational and experimental studies suggest that both a homolytic, radical chain unzipping mechanism during thermolysis, and a cationic, acid-catalyzed unzipping mechanism. The two proposed mechanistic pathways are shown in FIG. 1. Given competing possible reaction pathways, and that multiple experimental and processing parameters could conceivably impact the observed degradation behavior derived from either of the potential degradation mechanisms, it is perhaps unsurprising that the thermal degradation behavior of cPPA exhibits considerable variability.

Recycling stimuli-responsive low ceiling temperature (Tc) polymers has only been reported for poly(benzyl ether)s, cyclic poly(phthalaldehyde) (cPPA), and poly(ethylglyoxylate)s. However, these processes were limited by low yields and the inability to produce materials with properties equivalent to the pristine material.

BRIEF SUMMARY

A composition is provided that may include a cyclic poly(phthalaldehyde) (cPPA), a low amount of a Lewis acid catalyst, and a plasticizer.

According to another embodiment, a method for stabilizing cPPA to enable thermal processing of a bulk solid is provided. The method may include purifying cPPA by lowering a concentration of a Lewis acid catalyst to less than about 10 μmol/g; and adding a plasticizer to the cPPA.

According to another embodiment, a method of recycling a material comprising cPPA is provided. The method may include heating the material comprising cPPA to a temperature at or above a depolymerization temperature of the cPPA and recovering monomers from degraded cPPA.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
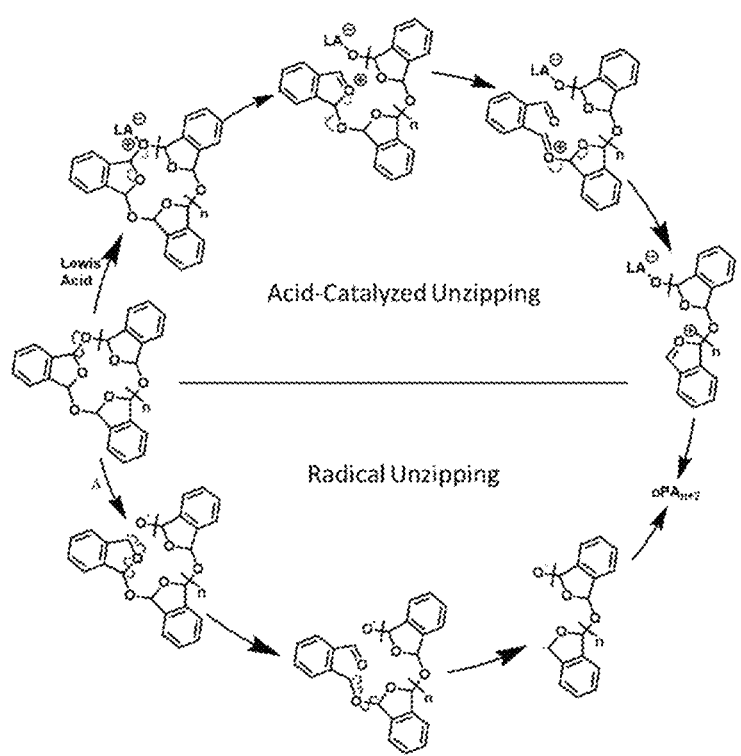
FIG. 1. Previously proposed cPPA degradation mechanisms. Acid-catalyzed, cationic unzipping (top) and homolytic, radical chain unzipping (bottom).

The composition and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the composition and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

The present disclosure discloses a thermally stable cPPA and methods of preparing the same. Improved thermal stability of the cPPA polymer enabled thermal processing of cPPA into a bulk solid. Photodegradable cPPA is also provided.

The present disclosure also provides methods for tailoring the thermal degradation behavior cPPA and leveraging that control to enable thermal processing and molding in bulk quantities.

The present application also provides materials capable of thermally mediated recycling and methods of thermally mediated recycling of cPPA and carbon fiber-reinforced cPPA composites. Additionally, cPPA composites with either continuous carbon fiber or carbon nanofiber reinforcements are provided and capable of being thermally recycled.

A composition is provided that may include a cyclic poly(phthalaldehyde) (cPPA), a low amount of a Lewis acid catalyst, and optionally a plasticizer.

The cPPA may have a chemical structure as shown in formula (I), where n can be at least 1. In some aspects, n can be at least 3. In some aspects, n can be any integer ranging from 3 to 400. The cPPA may be substituted or unsubstituted. The number average molecular weight of the cPPA may range from about 10 kDa to about 350 kDa.

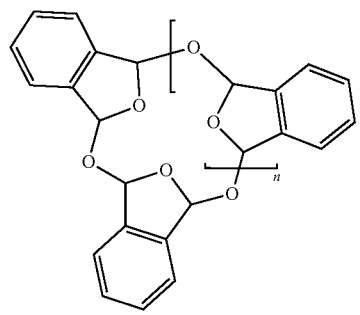

(I)

Suitable substituents include, but are not limited to, halogen, —NO₂, alkyl, —OH, —NH₂, —CN, haloalkyl, alkoxy, aryl, heteroaryl, heterocyclyl, and the like.

In some aspects, the low amount of Lewis acid catalyst may be an amount of less than about 10 μmol/g. In some aspects, the amount of Lewis acid catalyst in the composition is less than 12 μmol/g, 11 μmol/g, 10 μmol/g, 9 μmol/g, 8 μmol/g, 7 μmol/g, 6 μmol/g, 5 μmol/g, 4 μmol/g, or 3 μmol/g. In some aspects, the amount of Lewis acid catalyst in the composition may be below the detection limit of the instrumentation. In some aspects, the composition may be substantially free of the Lewis acid catalyst.

The composition may include any Lewis acid catalyst such as, for example titanium tetrachloride, boron trifluoride, tin(IV) chloride, aluminium chloride, zinc chloride, an alkyl aluminum chloride, or any combination thereof. Examples of alkyl aluminum chloride include, but are not limited to, methyl aluminum chloride, ethyl aluminum chloride, or triethyl aluminum chloride. In some aspects, the Lewis acid catalyst is boron trifluoride.

The composition may include one or more plasticizers. In some aspects, the plasticizer may be a dialkyl phthalate. Examples of dialkyl phthalates include, but are not limited to, dimethylphthalate, diethylphthalate, dibutylphthalate, dihexylphthalate, and dioctylphthalate. Other plasticizers include, but are not limited to, arenes such as xylene, and long-chain alkyl ethers such as dibutyl ether. Long-chain alkyl ethers refers to ethers with alkyl chains having at least four carbon atoms. In some aspects, the plasticizer may be diethylphthalate.

The amount of plasticizer in the composition may range from about 1 phr (parts per hundred rubber) to about 100 phr. In some aspects, the amount of plasticizer is about 10 phr, 20 phr, 30 phr, 40 phr, or about 50 phr.

In some aspects, the cPPA may degraded when contacted by an acid. The acid may be a strong mineral acid or an organic acid. Examples of acids include, but are not limited to, hydrochloric acid, sulfuric acid, acetic acid, and trifluoroacetic acid.

In some aspects, the cPPA may degraded when exposed to a temperature of about 120 to about 200° C.

In some aspects, the composition may include an oxidant. The oxidant can be any oxidant capable of single electron transfer. Examples of oxidants include, but are not limited to, 2,3-dichloro-5,6-dicyanobenzoquinone, chloranil, and benzoquinone. The presence of an oxidant will induce the degradation of the cPPA. By varying the amount of oxidant in the composition, the rate of cPPA degradation can be controlled or tuned to the desired application. The amount of oxidant in the composition may range from about 0.1 weight % to about 10 weight %. In some aspects, the amount of oxidant in the composition may range from about 0.1 weight % to about 5 weight % or from about 0.2 weight % to about 3 weight %.

In some aspects, the composition may include one or more photooxidants. Examples of photooxidants, include but are not limited to, 1,2,4,5-tetracyanobenzene; 9,10-dicyanoanthracene; N-methylquinolinium iodide; N-methylquinolinium hexafluorophosphate; N-methylacridinium iodide; and N-methylacridinium hexafluorophosphate. The amount of photooxidant in the composition may range from about 0.01 phr to about 10 phr. In some aspects, the amount of photooxidant in the composition may be from about 0.05 phr to about 1 phr.

One of the benefits of photooxidative triggering is that a wide array of photooxidants can be used that exhibit fundamentally different absorptive properties, allowing tuning of degradation across parameters that include: excited state redox potential, ground state redox potential, and trigger wavelength.

In some aspects, the composition may include one or more stabilizers. Examples of stabilizers include, but are not limited to, a sacrificial reductant, an organic base, a nucleophile, pyridine or a derivative, an alkylamine, or an alcohol.

In some aspects, the stabilizer may include one or more of anisole; 1,4-dimethoxybenzene; 1,3,5-trimethoxybenzene; 1,2,4-trimethoxybenzene; diphenyl ether; biphenyl and its alkoxylated derivatives; aniline; or any other low $E_{ox}$ organic compound. Low $E_{ox}$ refers to compounds with oxidation potentials lower than that of cPPA. Approximate values that would be considered to be low are $E_{ox} < 2$ V vs saturated calomel electrode reference potential (SCE).

In some aspects, the stabilizer may be (2,2,6,6 tetramethylpiperidin-1-yl)oxyl (TEMPO) or N,N'-di-sec-butyl-1,4-phenylenediamine (DBPDA).

The amount of stabilizer in the composition may range from about 1 phr (parts per hundred rubber) to about 100 phr. In some aspects the amount of stabilizer is about 10 phr, 20 phr, 30 phr, 40 phr, or about 50 phr.

A method for stabilizing cPPA to enable thermal processing of a bulk solid is provided. The method may include purifying cPPA by lowering a concentration of a Lewis acid catalyst to less than about 10 µmol/g; and adding a plasticizer to the cPPA.

The concentration of the Lewis acid catalyst may be lowered by any means available to one of skill in the art. For example, Lewis acid catalyst may be removed from the cPPA by slow dropwise precipitation of the cPPA into a solvent. A droplet of unpurified cPPA that is added to the solvent by be less than about 20 µL. In some aspects, the droplet is about 15 µL.

The cPPA may be precipitated into a suitable solvent. Suitable solvents include, but are not limited to, methanol or water.

After lowering the concentration of Lewis acid catalyst, the cPPA may be further stabilized by adding a stabilizer to the cPPA. Any stabilizer described herein can be added.

In other aspects, a method of manufacturing a bulk transient polymer capable of triggered depolymerization is provided. The method may include preparing a stabilized cPPA as described herein. The stabilized cPPA may be dissolved into a second solvent to form a purified cPPA solution. Suitable second solvents include, but are not limited to, volatile organic solvents such as, for example dichloromethane or chloroform.

A plasticizer may be dissolved in the second solvent to form a plasticizer solution. Any plasticizer described herein can be used. In some aspects, the plasticizer may be dissolved directly into the purified cPPA solution. If dissolved separately, then the purified cPPA solution with the plasticizer solution are mixed to form a mixture. The amount of plasticizer in the dissolved in the second solvent may be sufficient to provide an amount in the bulk transient polymer ranging from about 1 phr (parts per hundred rubber) to about 100 phr. In some aspects, the amount of plasticizer is about 10 phr, 20 phr, 30 phr, 40 phr, or about 50 phr.

The mixture is then cast into a film to obtain a cPPA film. The film is dried to remove the second solvent. The dried cPPA film is then melted and added into a mold to cool and solidify the cPPA. Finally, the solidified cPPA can be removed from the mold to obtain a bulk transient polymer capable of triggered depolymerization.

In some aspects, the method may include dissolving a stabilizer in the second solvent with the plasticizer. Any stabilizer described herein can be added.

In some aspects, a bulk transient material is provided that may include a cyclic poly(phthalaldehyde) (cPPA), a low amount of a Lewis acid catalyst, and optionally a plasticizer, a stabilizer, an oxidant, a photooxidant, or any combination thereof. In some aspects, the bulk transient material comprises cPPA and a plasticizer. In some aspects, the bulk transient material comprises cPPA, a plasticizer, and a photooxidant.

In some aspects, the bulk transient material may have a thermal degradation onset temperature above 100° C. In some aspects, the onset temperature may be between 110° C. and 130° C. In some aspects, the onset temperature may be above 130° C.

In other aspects, a device is provided that is made at least in part from any composition described herein or the bulk transient material produced by the methods described herein.

In some aspects, a method of recycling a material comprising cPPA is provided. The method may include heating the material comprising cPPA to a temperature at or above a depolymerization temperature of the cPPA; and recovering monomers from degraded cPPA.

The depolymerization temperature may be above about 100° C. In some aspects, the depolymerization temperature may be above about 110° C., 120° C., or 130° C.

In some aspects, the heating step may be conducted under vacuum.

In some aspects, the material may include a fiber. The fiber may comprise any length, for example the fiber may be a nanofiber, chopped, or continuous. In some aspects, the fiber may include carbon fibers. In some aspects, the fiber may include carbon nano-fibers. The material may be a woven fabric, as well as glass and polymer fiber reinforcements.

The recovered monomer may be repolymerized by cooling in a solvent such as dichloromethane. A Lewis acid catalyst can be added such as $BF_3$ to initiate repolymerization. The reaction can be quenched by adding pyridine. The recycled cPPA polymer can then be precipitated in a solvent such as methanol, to complete one cycle or generation.

EXAMPLES

Example 1: Materials and Instrumentation

Unless otherwise specified, all materials were purchased from Sigma-Aldrich and used without further purification. HPLC grade solvents were purchased from commercial sources and used without further purification for polymer purification and solvent casting. HPLC grade methanol was purchased from VWR, and HPLC grade dichloromethane was purchased from Fisher Scientific. ortho-Phthalaldehyde was purchased from TCI America and purified by recrystallization, according to a literature procedure. Cyclic poly(phthalaldehyde) was synthesized as described in Kaitz, J. A.; Diesendruck, C. E.; Moore, J. S. J. Am. Chem. Soc. 2013, 135 (34), 12755-12761, which is incorporated by reference in its entirety.

Analytical gel permeation chromatography (GPC) was performed using a Waters 1515 isocratic HPLC pump and Waters 2707 96-well autosampler, equipped with a Waters 2414 refractive index detector and 4 Waters HR Styragel columns (7.8×300 mm, HR1, HR3, HR4, and HR5) in THF at 30° C. The GPC system was calibrated using monodisperse polystyrene standards.

Dynamic thermogravimetric analysis (TGA) was performed using a TA Instruments Q500 TGA under a nitrogen atmosphere (90 mL/min). Dynamic TGA traces were obtained during a 5° C./min ramp after equilibration at 45° C. TGA samples consisted of 5-6 mg of the analyte film in a platinum pan.

$^1$H NMR spectra were recorded at 500 MHz using a Bruker Ascend 500 spectrometer equipped with a 5 mm broadband cryoprobe and SampleXpress autosampler. Spectra were obtained in either chloroform-d or tetrahydrofuran-$d_8$. Residual proton solvent was used as an internal standard (CHDCl$_2$ (1H) 5.32 ppm; THF-$d_7$ (1H), 1.72 and 5.32 ppm).

Dynamic mechanical analysis (DMA) was performed on a TA Instruments RSA III fitted with thin film grips provided by TA Instruments. Specimen dimensions were 5 mm×20 mm×200 μm, and the gauge length was set to 10 mm. Dynamic loading was applied at 1 Hz and 0.1% strain amplitude, and the temperature was increased 5° C./min from −60 to 80° C.

Differential scanning calorimetry (DSC) measurements were performed using a TA Instruments Q20 different scanning calorimeter. Polymer samples weighing ca. 5 mg were loaded into a standard aluminum pan and sealed with a hermetic lid. The samples were cooled to −100° C. and ramped at 20° C./min to 115° C., and the cooling/heating cycle was repeated for a total of three heating cycles.

Example 2: Solvent Casting cPPA Films

A. Pristine cPPA Films cPPA films were prepared using a modification of a literature procedure. For example: cPPA (100 mg) was dissolved in HPLC grade dichloromethane (3 mL), and gently vortexed until the mixture was no longer turbid. The solution was then cast into a 50 mm diameter PTFE-lined petri dish and placed in an enclosure with an atmosphere partially saturated with dichloromethane. The film was allowed to dry undisturbed at 22° C. for 24 h, affording a free-standing 95 mg film. After dying, the film was stored at −20° C. until use.

B. Inhibited cPPA films

Inhibited cPPA films were produced by modification of the same method described above. For example: 10.0 mg of TEMPO was dissolved in 5.0 mL of HPLC grade dichloromethane. 100 mg cPPA was weighed into a scintillation vial, and 1.0 mL of the TEMPO solution was added, followed by 2.0 mL of HPLC grade DCM. The solution was then cast into a 50 mm diameter PTFE-lined petri dish and placed in an enclosure with an atmosphere partially saturated with dichloromethane. The film was allowed to dry undisturbed at 22° C. for 24 h, affording an orange, free-standing 98 mg film. After dying, the film was stored at −20° C. until use.

TEMPO and DBPDA were added to inhibit the depolymerization of cPPA. Both TEMPO and DBPDA significantly increased the degradation onset temperature for cPPA. It was also discovered that the concentration of residual BF$_3$ is significantly decreased by precipitating the polymer in 15 μL droplets, which resulted in a drastic increase of the degradation onset temperature. cPPA, plasticized with DEP and stabilized with DBPDA, was hot press molded twice at 100° C. into bulk specimens that maintained both heat and acid triggered depolymerization functionality. This is the first demonstration of a bulk polymer solid with the capability of triggered depolymerization. While some other low ceiling temperature polymers are amenable to bulk processing, such as poly(oxymethylene), depolymerization requires harsh conditions or occurs at much longer time scales.

Figure 2:
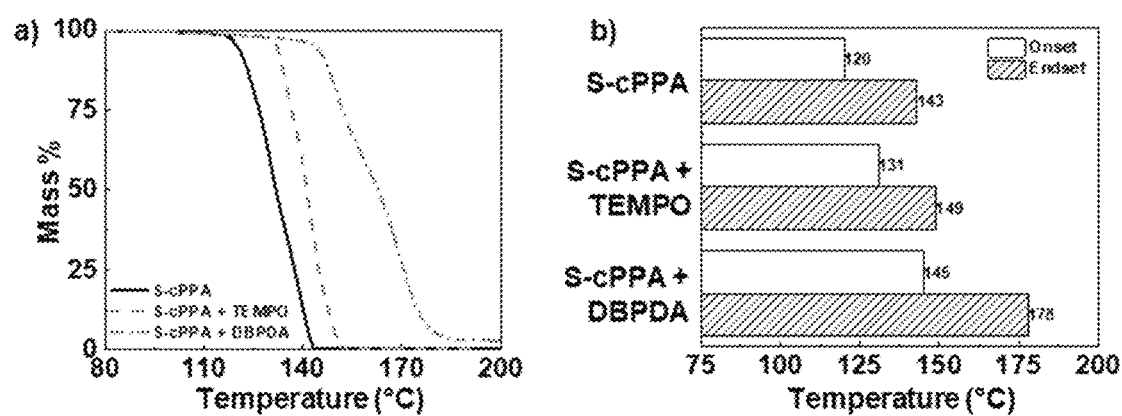
FIG. 2. Effects of TEMPO and DBPDA on cPPA thermal stability. (A) Dynamic TGA results of S-cPPA films doped with TEMPO and DBPDA during 5° C./min ramp experiments. (B) Bar chart of onset and endset temperatures for neat, TEMPO-doped, and DBPDA-doped S-cPPA films from dynamic TGA experiments.

Without being bound by any particular theory, TEMPO may act as a radical trap, potentially inhibiting thermal degradation via the homolytic unzipping pathway, while DBPDA may behave as a Lewis base, inhibiting degradation in the case of an operative acid-catalyzed degradation pathway.

cPPA thin films were solvent cast from DCM, incorporating 2 phr TEMPO and DBPDA, separately, and the thermal degradation was measured by dynamic thermogravimetric analysis (TGA). These films were cast using cPPA prepared via standard, unoptimized methods (S-cPPA). Interestingly, both additives slowed the thermal degradation of cPPA. Representative TGA traces of pristine, TEMPO-doped, and DBPDA-doped cPPA in FIG. 2 show significant changes in thermal degradation behavior. Addition of TEMPO increased the average degradation onset temperature from 120° C. for the pristine polymer to 131° C., while addition of DBPDA stabilized the polymer even further, increasing the onset temperature to 145° C. Further, the DBPDA-doped film exhibited the greatest onset-endset gap, indicating that not only does DBPDA increase the onset temperature, but that the degradation kinetics in the presence of DBPDA were significantly slower. Notably, the fact that both TEMPO and DBPDA inhibit thermal degradation of cPPA is consistent with the conclusion that both radical and cationic degradation mechanisms are operative.

C. cPPA Film for Hot Pressing Feedstock

A modification of the above procedure was used to produce the cPPA film used as feedstock for hot pressing. Briefly, 1600 mg of P-cPPA was weighed into a 50 Erlenmeyer flask and dissolved into 15 mL HPLC grade dichloromethane. DBPDA (48 mg) and DEP (320 mg) were weighed into a scintillation vial and dissolved in 5 mL dichloromethane. The DPBDA/DEP solution was then added to the cPPA solution, and the mixture was vortexed briefly to ensure thorough mixing. The solution was then cast into a 100 mm diameter PTFE-lined petri dish and placed in an enclosure with an atmosphere partially saturated with dichloromethane. The film was allowed to dry undisturbed at 22° C. for 24 h, and subsequently dried in vacuo for 24 h to ensure thorough removal of residual solvent. A free standing, red orange-red film was obtained (2.0 g) and stored at −20° C. until use.

Example 3: Purification of cPPA

The purification of cPPA was accomplished by the slow precipitation of the polymer from dichloromethane into methanol. A representative procedure is as follows: cPPA (5.0 g, Mn=231 kDa) was dissolved in 50 mL HPLC grade dichloromethane. The cPPA solution was then added dropwise via burette to 1.0 L of rapidly stirred HPLC grade methanol at an approximate flow rate of 1 mL/min. After dropwise addition was complete, the methanol mixture was decanted, and the polymer was immersed in 100 mL of methanol. After settling for 30 minutes, the methanol-polymer mixture was decanted again. Immersion in another 100 mL of methanol, followed by suction filtrated afforded a white solid. The polymer was dried in vacuo for 24 hours, and the purified cPPA was recovered as a brittle white solid (3.5 g, Mn 266 kDa).

In lieu of treatment with triethylamine, it was found that the rate of precipitation of the polymer into methanol greatly impacted the amount of trace $BF_3$ in the isolated material and, in turn the thermal stability.

Figure 6:
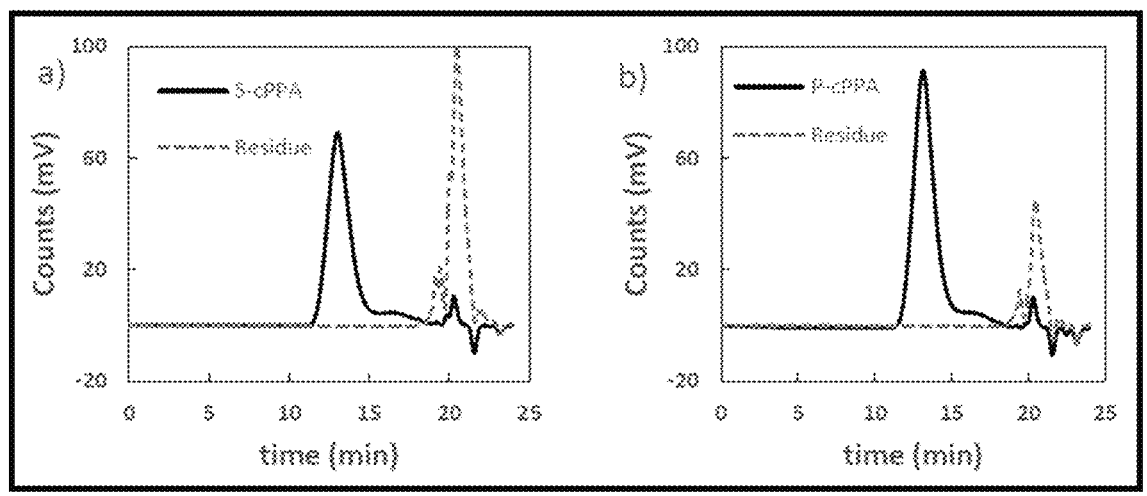
FIG. 6. Representative GPC traces of (a) S-cPPA and (b) P-cPPA powder before and after degradation triggered by heating to 140° C. for 5 minutes.

Typically, cPPA is purified by rapid precipitation from DCM into methanol (S-cPPA). This precipitation affords cPPA with two major impurities-methanol (measured by $^1H$ NMR) and $BF_3$ (measured by elemental analysis). Concentrations of methanol and $BF_3$ for the batch of cPPA used in this study are given in Table 1, though it should be noted that batch-to-batch concentrations may vary widely. Dropwise precipitation of cPPA from DCM into methanol (ca. 15 μL droplets) resulted in a significantly lower concentration of $BF_3$, as well as a higher concentration of methanol (P-cPPA). Additionally, slow precipitation resulted in a slight increase in Mn (231 to 266 kDa) and a decrease in PDI (1.42 to 1.23) due to removal of small molecules and oligomers (FIG. 6). Without being bound by any particular theory, it is hypothesized that dropwise precipitation minimizes entrapment of residual $BF_3$ and oligomer in the polymer, resulting in a higher purity product.

TABLE 1

Concentrations of methanol and $BF_3$, and molecular weight data for cPPA produced via standard procedures and after purification.

| Polymer Sample | Impurity Concentrations | | Molecular Weight Data | |
| --- | --- | --- | --- | --- |
| | [MeOH] (μmol/g) | [$BF_3$] (μmol/g) | $M_n$ (kDa) | PDI |
| S-cPPA | 27.4 | 17.5 | 231 | 1.42 |
| P-cPPA | 47.3 | 3.5 | 266 | 1.23 |

Dynamic TGA traces of S-cPPA and P-cPPA are shown in FIG. 3a. Notably, the improved purification process results in a 26° C. increase in the degradation onset temperature. To test the individual effects of methanol and $BF_3$, two control experiments were performed. S-cPPA was doped with methanol by adding 5% methanol to the polymer solution in DCM before casting, resulting in a methanol concentration of 50 μL/g, similar to that of the purified polymer. While a slight increase in degradation onset and endset temperatures was observed, the small effect does not account for the enhanced stability observed for P-cPPA. Conversely, a P-cPPA film doped with 25 μmol/g $BF_3$ resulted in significantly depressed onset and endset temperatures, indicating that the presence of $BF_3$ is extremely detrimental to the thermal stability of the polymer. Without being bound by any particular theory, the enhanced stability of the purified cPPA may be due to the removal of residual $BF_3$.

Figure 3:
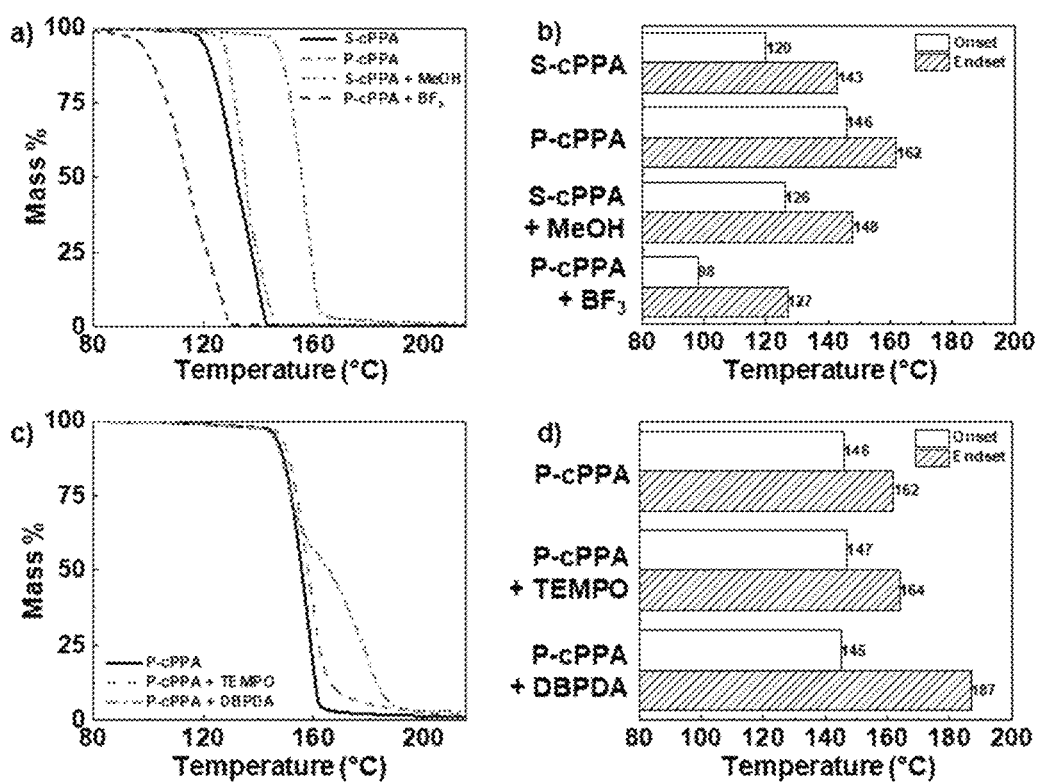
FIG. 3. Effects of impurities and stabilizers on cPPA thermal stability. (A) Dynamic TGA traces at 5° C./min of S-cPPA, methanol-doped S-cPPA, P-cPPA, and $BF_3$-doped P-cPPA. (B) Bar chart of onset and endset temperatures for S-cPPA, methanol-doped S-cPPA, P-cPPA, and $BF_3$-doped P-cPPA during 5° C./min ramp experiments. (C) Dynamic TGA traces at 5° C./min of a P-cPPA film and P-cPPA films doped with TEMPO and DBPDA. (D) Bar chart of onset and endset temperatures from dynamic TGA experiments for P-cPPA, TEMPO-doped P-cPPA, and DBPDA-doped P-cPPA films.

The effect of TEMPO and DBPDA on the thermal degradation of purified cPPA was investigated. Films were prepared as described above, and the degradation kinetics were measured by TGA. As shown in FIG. 3, P-cPPA with and without inhibitors began to depolymerize at ca. 145° C. Notably, the addition of TEMPO did not significantly affect the degradation behavior of the cPPA, indicating that whatever potential radical pathway was operative in the S-cPPA is no longer a major degradation pathway in P-cPPA. In contrast, addition of DBPDA did not significantly change the depolymerization onset, but did substantially slow the rate of the depolymerization, resulting in the highest endset temperature of any cPPA (187° C.). Without being bound by any particular theory, it is hyposthesized that an acid-catalyzed, cationic degradation mechanism may still be the operative thermal degradation pathway for P-cPPA at elevated temperatures greater than 140° C.

Previously, thermal processing was not feasible because S-cPPA degraded at relatively low temperatures. Since the temperature of degradation was well below any glass or melt transitions, it was not possible to use thermal processing techniques without also depolymerizing the cPPA. Thermal processing has several advantages over solvent casting including: minimal residual solvent, more complex architectures with the use of molds, and less waste of toxic solvents.

The thermal transitions of cPPA were depressed by incorporating a plasticizer, diethylphthalate (DEP). A plasticized cPPA film was solvent cast from a solution of P-cPPA, 20 phr of DEP, and 3.0 phr of DBPDA in DCM. After solvent evaporation, a free-standing, plasticized, and inhibited cPPA film was recovered. The glass transition temperature of this film was measured by differential scanning calorimetry (DSC) to evaluate the degree of plasticization. The glass transition temperature for our DEP-doped film was measured to be 24° C. (FIG. 4a), confirming significant plasticization of cPPA. The repeatability of the DSC results over three consecutive heat-cool-heat cycles, from −100-115° C., confirmed that the glass transition temperature was repeatable and that the polymer was stable to relatively high temperatures (>100° C.). This is in contrast to DSC scans of standard cPPA cast from DCM, where the polymer film begins to degrade at temperatures >100° C.

The viscoelastic behavior of the film was measured by DMA. Consistent with the DSC measurements, the average $T_g$ was measured from the peak of tan δ to be 30° C. The storage modulus of the polymer film was ca. 1 GPa at 22° C., but decreased significantly as the material was heated past its glass transition temperature. At 75° C. the storage modulus of the polymer film dropped to 10 MPa—a full two orders of magnitude lower than in the glassy regime. It was difficult to retrieve viscoelastic data at temperatures greater than 75° C. due to resolution limits of the instrumentation.

Figure 4:
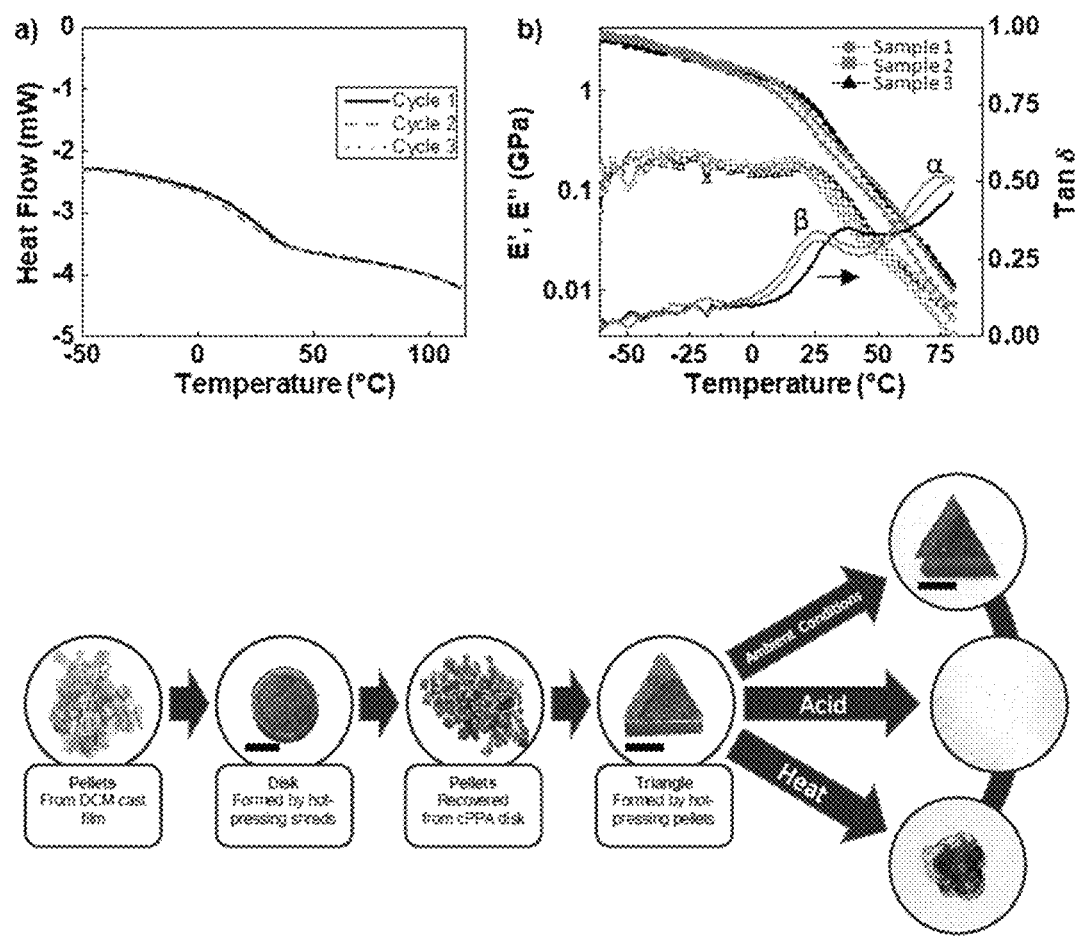
FIG. 4. Thermal processing of cPPA and bulk solid transience. (a) DSC scans collected at a 20° C./min heating rate and (b) DMA scans collected at a 5° C./min heating rate, showing glass transitions at 24 and 30° C., respectively. (c) Procedural schematic of bulk solid formation via cPPA hot press molding. Recyclable cPPA thermoforming process showing: 1. shredded cPPA stock, 2. a hot press molded cPPA disk, 3. cPPA pellets recovered from the cPPA disk, and 4. a hot press molded triangle formed from the recovered cPPA pellets. Thermoformed cPPA subjected to: 5. ambient conditions in which the material remains stable, 6. Acid, and 7. heat in which depolymerization is triggered. Scale bars are 12.7 mm.
Figure 5:
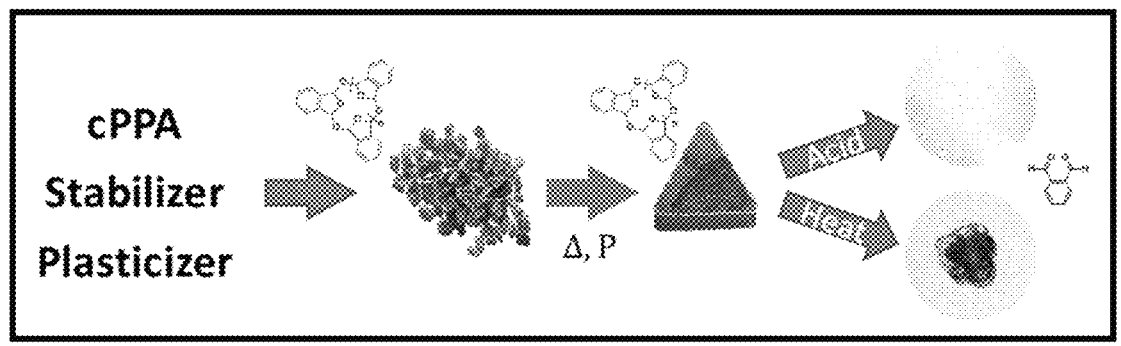
FIG. 5. The thermally-triggered depolymerization of cyclic poly(phthalaldehyde) (cPPA).

A feedstock of pellets was created from the plasticized cPPA film and then hot pressed in an aluminum mold to create bulk cPPA solid specimens (FIG. 4c). The pellets were hot pressed at 100° C. under an applied pressure of 80 kPa for 15 min. A temperature of 100° C. was chosen based on a combination of DMA experimental data and observed behavior of the plasticized cPPA at elevated temperatures, and degradation onsets measured by dynamic TGA experiments. Fifteen minutes under applied pressure was sufficient for the polymer to flow, fill the mold cavity, and produce a uniform disk shape after cooling. The resulting cPPA disk was cut to form pellets for a second round of hot pressing into a triangular mold. Under the same hot press molding conditions, a bulk equilateral triangular piece was successfully molded measuring 2.54 cm on each side and 2.5 mm thick. The molecular weight and NMR spectra were measured for the final triangular specimen to evaluate the effects of two successive thermal processing cycles on the stability of the polymer. The molecular weight measured after this second thermal processing was 136 kDa showing no significant molecular weight decrease. Some monomer was observed by NMR (FIG. 10), but a significant amount of polymer remained.

How the incorporation of a plasticizer and inhibitor affected its triggered depolymerization response was investigated. FIG. 4c demonstrates both heat and acid triggering mechanisms. The addition of trifluoroacetic acid immediately began to depolymerize the bulk cPPA part, resulting in the complete depolymerization of cPPA into oPA within 15 min. Similarly, an elevation in temperature to 150° C. degraded the bulk cPPA object within 1 min, resulting in the evaporation of the monomer oPA and formation of red residue from the DBPDA.

These results demonstrate an approach to the thermal processing of a 2.5 mm thick bulk cPPA. The multiple cycles of hot press molding confirmed that the disclosed material can flow at moderate temperatures and under low pressures without undergoing significant thermally-triggered depolymerization. To date, only relatively thin (ca. 400 μm) cPPA films could be successfully produced by solvent casting.

The composition and methods disclosed herein solve a longstanding technical challenge for processing cPPA. For the first time, the facile manufacture of bulk transient polymer capable of triggered depolymerization is shown.

Example 4: GPC Traces of S-cPPA and P-cPPA

To confirm that the purification of cPPA resulted in a polymer with similar molecular weight characteristics, GPC traces of S-cPPA and P-cPPA produced from the same batch of polymer were analyzed. The molecular weight data for the two polymers is summarized in Table 2. The Mn increases slightly upon purification of cPPA, while the Mw remains largely unchanged, resulting in a more monodisperse polymer after purification. This is likely the result of small molecules and oligomers being removed during the purification process.

Additionally, samples of S-cPPA and P-cPPA were heated to 140° C. in an oven for 5 minutes. The polymers degraded rapidly, leaving behind a visible residue. GPC analysis of the residue (FIG. 6) indicates that both S-cPPA and P-cPPA undergo rapid thermal degradation, generating exclusively small molecule products.

TABLE 2

Representative molecular weight data for P-cPPA and S-cPPA.

|  | S-cPPA | P-cPPA |
| --- | --- | --- |
| $M_n$ (kDa) | 231 | 266 |
| $M_w$ (kDa) | 330 | 329 |
| PDI | 1.42 | 1.23 |

Example 5: $^1$H NMR Spectra of S-cPPA and P-cPPA

Figure 7:
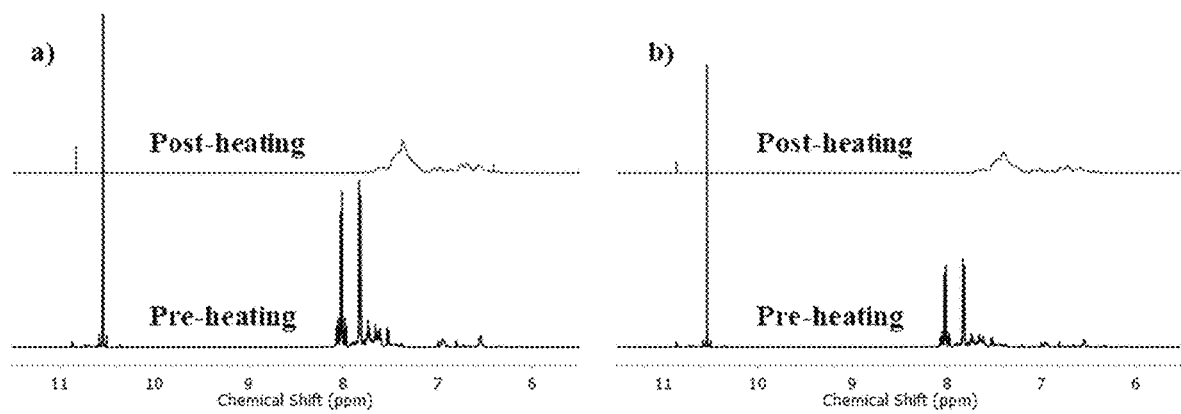
FIG. 7. Representative NMR spectra of (a) S-cPPA and (b) P-cPPA powder before (top) and after (bottom) degradation triggered by heating to 140° C. for 5 minutes. Spectra were collected in THF-$d_8$.

In addition to analysis by GPC, the S-cPPA and P-cPPA were analyzed by $^1$H NMR (FIG. 7). The spectra of the polymer samples match those reported previously.[8] Additionally, when samples of S-cPPA and P-cPPA were heated to 140° C. for five minutes, the polymers degraded rapidly, leaving behind a visible residue. $^1$H NMR analysis of the residue from both S- and P-cPPA thermal degradations indicates that both degradations result in the formation of ortho-phthalaldehyde as the primary product.

Example 6: Impurity Calculations for S-cPPA and P-cPPA

A. Calculation of $BF_3$ Concentration

The concentration of $BF_3$ in S-cPPA and P-cPPA was calculated from the mass % of fluorine present in the polymer sample, as measured by elemental analysis. The calculation is as follows:

$$\text{wt }\%_{BF_3} = \text{wt }\%_F \times \frac{MW_{BF_3}}{3 \times MW_F}$$

$$[BF_3] = \frac{\text{wt }\%_{BF_3}}{100 \times MW_{BF_3}}$$

Where wt $\%_{BF_3}$ is the weight percent of $BF_3$ in the polymer, wt $\%_F$ is the weight percent of fluorine in the polymer, as measured directly by elemental analysis, and $MW_x$ is the molecular weight/atomic mass of the respective moiety. Or, in a simplified version:

$$[BF_3] = \frac{\text{wt }\%_F}{300 \times MW_F}$$

Table 3 summarizes the fluorine concentrations measured by elemental analysis and the calculated $BF_3$ concentrations for S-cPPA and P-cPPA.

TABLE 3

Fluorine and $BF_3$ concentrations as determined by elemental analysis for S-cPPA and P-cPPA.

|  | S-cPPA | P-cPPA |
| --- | --- | --- |
| [F] (wt. %) | 0.10 | 0.02 |
| [$BF_3$] (μmol/g) | 17.5 | 3.5 |

B. Calculation of Methanol Concentration

The concentration of methanol in S-cPPA, P-cPPA and methanol-doped S-cPPA was determined by integration of the methanol methyl proton resonance in THF-$d_8$ at 3.27 ppm. The methyl resonance was compared to the total resonance integration of the cPPA polymer. The calculation is as follows:

$$[MeOH] = \frac{I_{MeOH}/H_{MeOH}}{I_{cPPA}/H_{cPPA}} \times \frac{1}{MR}$$

Where $I_{MeOH}$ is the integral of the methanol methyl resonance and $I_{cPPA}$ is the integral of the cPPA resonance; $H_{MeOH}$ is the number of protons corresponding to the methanol methyl resonance (3), and $H_{cPPA}$ is the number of protons corresponding to the cPPA repeat unit resonance (6); and MR is the molecular weight of the repeat unit (134.14 Da). Table 4 summarizes the integration values measured from the $^1$H NMR spectra, as well as the calculated methanol concentrations in S-cPPA, P-cPPA, and methanol-doped S-cPPA.

TABLE 4

$^1$H NMR integrations for cPPA and methanol in THF-$d_8$ and calculated residual methanol concentration.

|  | S-cPPA | P-cPPA | MeOH-Doped S-cPPA |
|---|---|---|---|
| $I_{MeOH}$ | 11.04 | 19.08 | 21.05 |
| $I_{cPPA}$ | 6000 | 6000 | 6000 |
| [MeOH] (μmol/g) | 27.4 | 47.3 | 52.3 |

Example 7: Thermal Processing of cPPA

Figure 8:
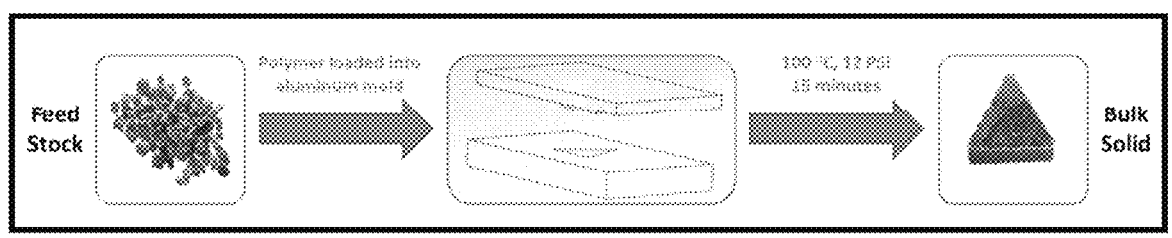
FIG. 8. Schematic of cPPA hot pressing procedure.

Hot pressed cPPA bulk solids were fabricated from the solvent cast films described in Example 2. The general process for fabrication of cPPA bulk solids is shown schematically in FIG. 8. The blended P-cPPA feed stock was cut with shears into ca. 3 mm square shreds, which were then placed into the female half of a circular aluminum mold that was treated with a PTFE mold release agent and preheated to 100° C. in an oven. The feed stock was allowed to equilibrate in the oven at 100° C., at which point the male half of the mold was placed on top, and 80 kPa of downward force was applied. After 15 minutes, the mold was removed from the oven and cooled to room temperature while maintaining the 80 kPa compressive force. After cooling, the bulk cPPA disk was removed from the mold. The disk was then cut into ca. 3 mm pellets, which were used as the feed stock for the fabrication of the cPPA triangle. The hot pressing procedure for fabrication of the cPPA triangle was identical to that of the disk.

Figure 9:
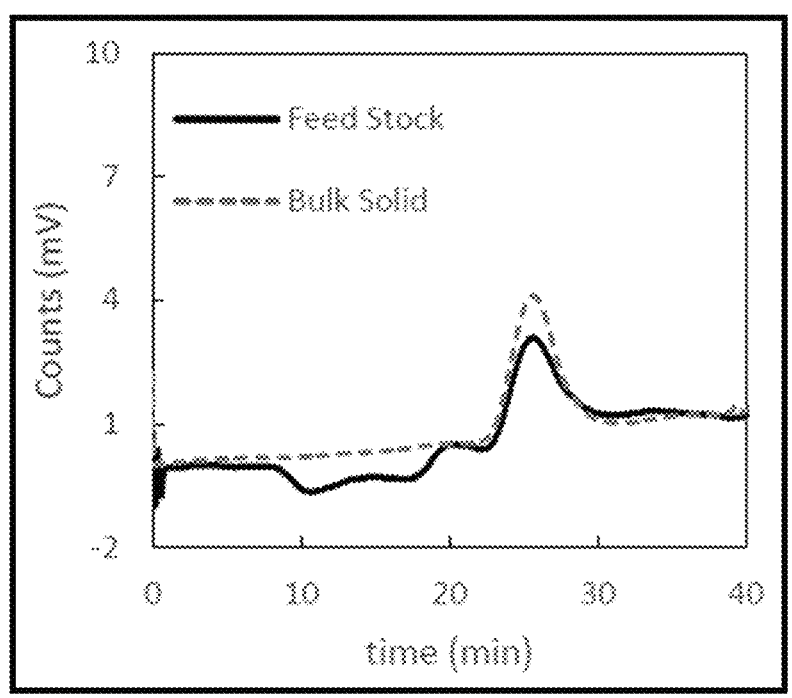
FIG. 9. GPC traces of the cPPA feed stock used in the hot pressing of cPPA bulk solids and the of the cPPA bulk solid after two cycles of hot pressing.

The integrity of the bulk cPPA solid was analyzed by GPC. As shown in FIG. 9, the GPC traces of the feed stock and bulk material agree, and show no significant change in molecular weight or distribution. The molecular weight data for the feed stock and bulk polymer are summarized in Table 5. The data indicate that the cPPA blend is stable to thermoforming conditions.

TABLE 5

GPC molecular weight data for P-cPPA feed stock and bulk cPPA.

|  | Feed Stock | Bulk cPPA |
|---|---|---|
| $M_n$ (kDa) | 130 | 136 |
| $M_w$ (kDa) | 204 | 212 |
| PDI | 1.58 | 1.56 |

Example 8: Triggered Depolymerization of Bulk cPPA

A. Acid-Catalyzed Degradation

Figure 10:
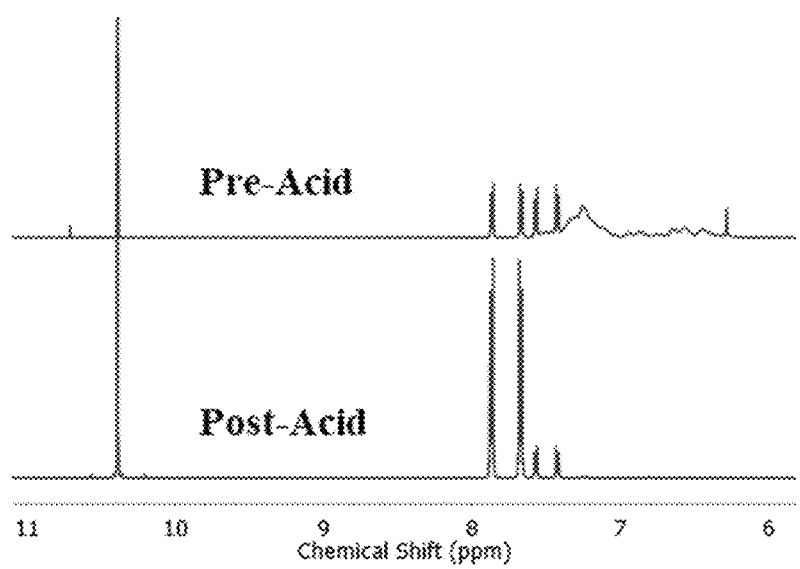
FIG. 10. $^1$H NMR of cPPA bulk solid in THF-$d_8$ before (top) and after (bottom) exposure to trifluoroacetic acid.

The acid triggered degradation of bulk cPPA was examined by placing a section of the bulk cPPA triangle (ca. 300 mg) onto a PTFE plate and droppering 50 μL trifluoroacetic acid onto the top of the cPPA solid. Complete degradation of the solid was observed within 15 minutes of the addition of acid. The degradation of the polymer resulted in a yellow, liquid residue. FIG. 10 shows the $^1$H NMR spectra of the cPPA bulk solid before and after acid degradation. Before acid treatment, the NMR spectrum shows resonances from cPPA, DEP (the plasticizer) and trace oPA (<5%). After exposure to trifluoroacetic acid, the cPPA resonances are no longer present, and the NMR spectrum shows only DEP and oPA, indicating complete unzipping of the polymer.

B. Thermal Degradation

The thermal degradation of the bulk cPPA solid was examined by placing a section of the cPPA triangle (ca. 250 mg) onto a glass surface. The surface was then transferred to a hot plate which was preheated to 150° C.

The solid rapidly degraded and evaporated, leaving a small amount of a red-black residue. The residue was of insufficient quantity to analyze by GPC or $^1$H NMR.

Example 9: Glass Transition Dependence on Diethylphthalate Concentration

Figure 11:
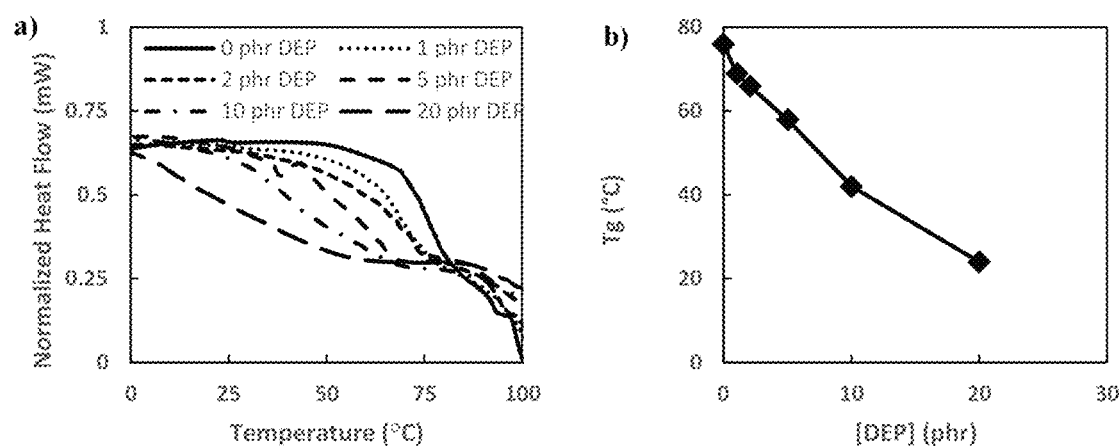
FIG. 11. Plasticizer concentration screening results. (a) DSC traces of cPPA films stabilized with 3 phr DBPDA and plasticized with varying concentrations of diethylphthalate (DEP). Traces were collected at a heating rate of 20° C./min. (b) Measured glass transition temperatures of cPPA films plotted against the concentration of DEP.

To select the most useful formulation of cPPA blend for hot pressing, the effect of the plasticizer diethylphthalate (DEP) was screened at various concentrations. Each cPPA sample was blended with 3 phr DBPDA as a stabilizer, and a varied amount of DEP ranging from 0 phr, to 40 phr. As shown in FIG. 11, the glass transition (Tg) of the polymer blend was reduced by the addition of 3 phr DBPDA and also exhibited strong dependence on the DEP concentration. Use of DEP as a plasticizer afforded cPPA blends with glass transitions ranging from 76° C. (0 phr DEP) to 12° C. (40 phr DEP). A cPPA blend of 3 phr DBPDA and 20 phr DEP was selected for use in hot pressing of bulk materials, as it afforded the largest range of processing temperatures, while exhibiting a glass transition slightly above room temperature (24° C.).

Example 10: Thermal Stability of Plasticized Polymer Blend

Figure 12:
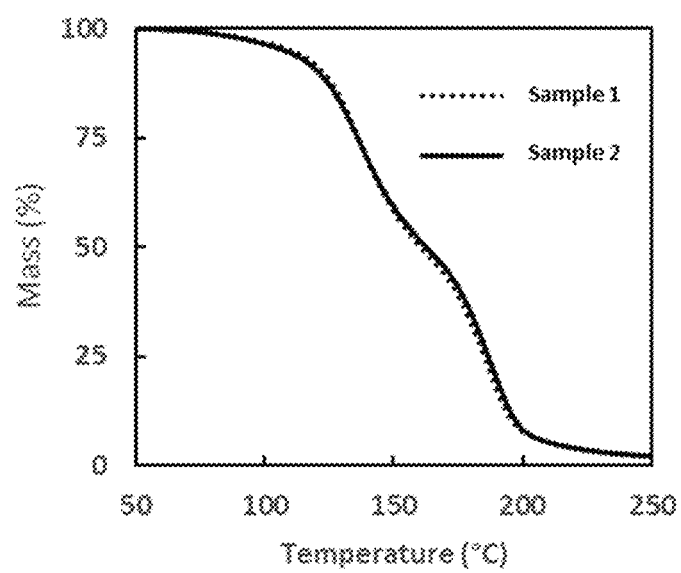
FIG. 12. TGA traces of an S-cPPA blend containing DEP (20 phr) and DBPDA (3 phr), as used in hot press molding. The red and black traces are duplicate runs, showing reproducible behavior. TGA traces were collected at a ramp rate of 5° C./min.

To ensure that the addition of plasticizer did not have a significantly deleterious effect on the stability of the cPPA blend, TGA scans were taken of the stabilized, plasticized feedstock used for hot pressing. Shown in FIG. 12 are two TGA traces of the plasticized material collected while heating to 250° C. The average onset temperature is 130° C., which is a marked depression, but well above the hot press temperature of 100° C. It is hypothesized that the addition of plasticizer increases mobility within the polymer matrix, increasing the kinetics of chain activation events.

Example 11: Dynamic Mechanical Analysis of Thermally Processed Blend

Figure 13:
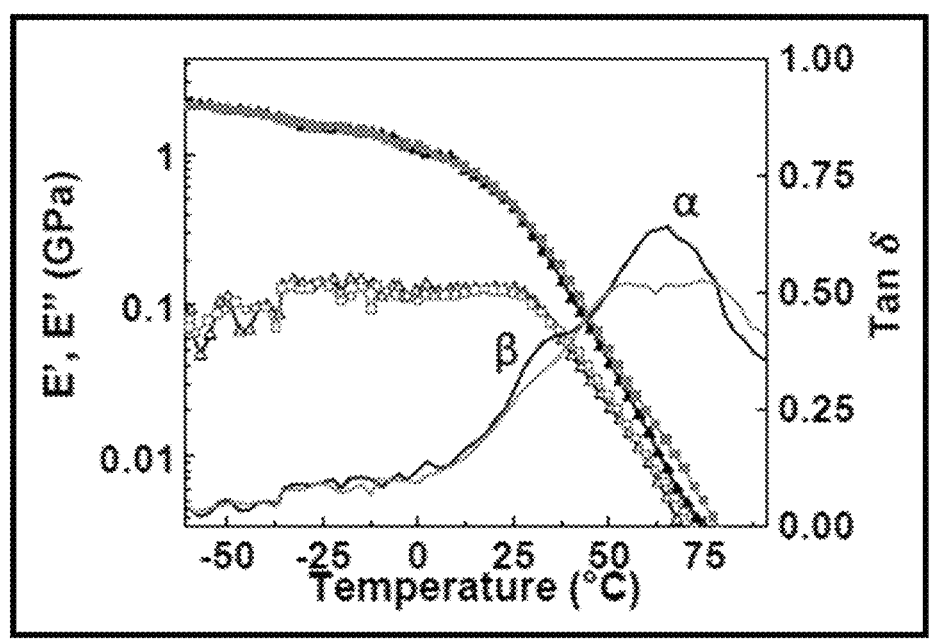
FIG. 13. Dynamic mechanical analysis of thermally processed S-cPPA film containing DEP (20 phr) and DBPDA (3 phr).

The dynamic mechanical response for cPPA films containing 3 phr DBPDA and 20 phr DEP, and which were thermally processed at 100° C. with an applied pressure of 80 kPa for 15 min, was measured. The results are shown in FIG. 13. The two thermal transitions, α and β, begin to blend together after thermal processing. The storage modulus is slightly lower than the solvent cast film at −50° C. at 2 GPa.

Example 12: cPPA Synthesis and Recycling

The purified oPA (12.0 g, 89.5 mmol) was dissolved in anhydrous dichloromethane (96 mL) under an inert argon atmosphere in flame dried glassware. The solution was cooled to −78° C., and 2 mol % boron trifluoride diethyl etherate (240 μL, 1.8 mmol) was added dropwise. The reaction was equilibrated for 2 h at −78° C. prior to the addition of pyridine (600 μL, 7.5 mmol). Following an additional 2 h equilibration period at −78° C., polymer was precipitated from methanol and washed with diethyl ether. Vacuum filtration afforded a white solid in quantitative yield.

cPPA depolymerizations were performed in a 40 mL Dailey vacuum sublimator from Chemglass at 0.1 Torr and 120° C. for 1 h, unless otherwise specified. The lower portion of the sublimator was maintained at the target temperature with a silicone oil bath heated on an IKA RCT Basic MAG digital round-top stirring hot plate equipped with an IKA ETS-D5 programmable temperature probe. oPA was collected in situ on a coldfinger maintained at 20° C. with a continuous stream of water. oPA was removed from the coldfinger and repolymerized without any further purification to yield recycled cPPA.

Preparation of cPPA Thin Films.

cPPA (100 mg) was dissolved in chloroform (1 mL). To minimize defects and ensure uniform film thickness, a chloroform-saturated casting environment was generated by placing a Petri dish filled with chloroform (10 mL) under a crystallizing dish (90 mm×50 mm). The cPPA solution was drop-cast into a poly(tetrafluoroethylene)-lined Petri dish and placed in the chloroform-saturated environment. The film was dried in the saturated environment for 18 h and subsequently dried in vacuo (0.1 Torr) for 24 h to remove residual solvent. Film thickness (40-100 µm) was varied by adjusting the initial amount of solution cast into the dish.

Characterization of Thermal Depolymerization.

cPPA thermal depolymerization was monitored by Raman spectroscopy using a Horiba LabRAM HR 3D Raman confocal imaging microscope equipped with a 785 nm laser, a 300 grooves/mm grating (blazed at 600 nm), a long working distance 20× objective from Olympus, and a Horiba Synapse back-illuminated deep-depletion CCD camera. Temperature control was achieved with a Linkam THMS600 heating and cooling stage. Target isothermal temperatures were reached following a linear ramp of 20° C./min. Thermal depolymerization was also monitored by thermal gravimetric analysis (TGA) with a TA Instruments Q500 TGA equipped with an evolved gas analysis furnace and platinum pans. Isothermal segments began after an initial linear ramp of 20° C./min to the target temperature. Chloroform (m/z 83) and oPA (m/z 134) evolution, corresponding to the mass loss observed in TGA traces, were monitored in real time with mass spectroscopy (MS) using a TA Instruments Discovery mass spectrometer. The mass spectrometer included a quadrupole detector equipped with a closed ion source, triple mass filter, and a dual (Faraday and secondary electron multiplier) detection system. The mass spectrometer and TGA were coupled with a heated transfer line maintained at 300° C. All TGA and MS analyses were performed in triplicate.

Characterization of Virgin and Recycled Materials.

$^1$H and $^{13}$C NMR spectra were obtained with a Varian 500 MHz spectrometer or an NMReady 60Pro 60 MHz NMR. Spectra were obtained in either chloroform-d, dimethyl sulfoxide-$d_6$, or tetrahydrofuran-$d_8$. cPPA molecular weight was determined via gel permeation chromatography on a system composed of a Waters 1515 isocratic HPLC pump, a Waters 2707 autosampler, a series of four Waters HR Styragel columns (HR1, HR3, HR4, and HR5), and a Waters 2414 refractive index detector. The system was calibrated with monodisperse polystyrene standards. Analyses were performed in HPLC grade THF (flow rate=1.0 mL/min) at 25° C.

The mechanical properties of virgin and recycled materials were evaluated with a combination of DMA and quasi-static tension. DMA tests on cPPA thin films were performed on a TA Instruments RSA III equipped with thin film grips supplied by TA Instruments. cPPA films were cut into rectangular samples of 30 mm×5 mm×120 µm using a steel punch, and the gauge length was maintained at 10 mm. Dynamic loading was applied at 1 Hz and 0.1% strain amplitude while the temperature was increased linearly at 5° C./min. Data were obtained for a minimum of five specimens.

Tensile measurements of cPPA thin films and cPPA/ carbon nanofiber (CNF) composite films were performed according to ASTM Standard D882 on a custom-built bidirectional-screw-driven rail table. Sample dimensions were maintained at 80 mm×5 mm×200 µm. The gauge length was set at 35 mm, crosshead displacement was maintained at 58.4 µm/s, and the applied load was monitored with a 220 N capacity load cell. Strain within the films was measured with a virtual extensometer (VE). Points utilized for VE analysis were applied directly to the films with flat white or black paint 5 mm from each end of the gauge length. Images were acquired every 125 ms with an Allied Vision Stingray F145c CCD camera equipped with an AF Micro-Nikkor 60 mm lens from Nikon. All equipment was controlled with LabView 2015 and an in-house program. Data were collected for a minimum of five specimens.

Tensile tests of continuous carbon fibers were performed in accordance with ASTM Standard D3822 on a custom-built load frame. Single carbon fibers were selected at random, mounted on cardstock tabs with a span of 25 mm using cyanoacrylate adhesive, and loaded in displacement control at 8 µm/s until failure with a Physik Instrumente M-2305 high resolution linear actuator controlled with LabView 2015 and an in-house program. Applied load was measured with a 150 g load cell (Honeywell Sensotec). The fracture surfaces were collected, and the diameters were determined optically. Data were collected for a minimum of 50 specimens. The properties of virgin and recycled continuous carbon fibers were also qualitatively analyzed with scanning electron microscopy (SEM) with a Philips XL30 ESEMFEG. Prior to SEM imaging, fibers were mounted on carbon conductive tape and sputtered with a 12 nm layer of gold/palladium via a Denton Desk II TSC turbo-pumped sputter coater.

Figure 14:
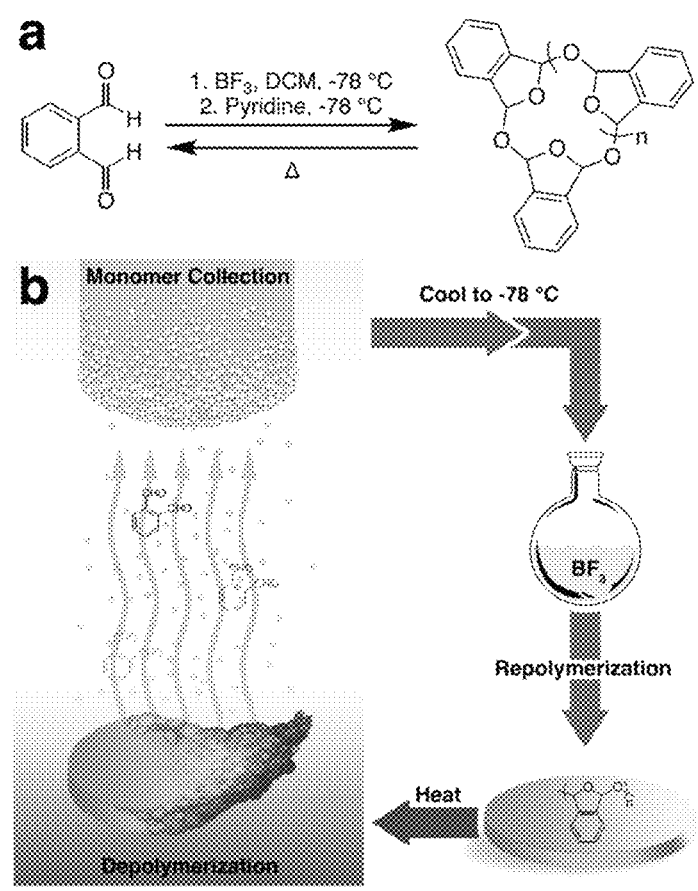
FIG. 14. (a) Thermally mediated polymerization and depolymerization of cPPA. (b) Illustration of cPPA depolymerization, monomer transport and collection, and repolymerization processes inherent to the envisioned recycling protocol.

The approach to thermally mediated recycling is summarized in FIG. 14. cPPA films were generated via drop casting cPPA/chloroform solutions (100 mg cPPA/mL chloroform) into poly(tetrafluoroethylene)-lined Petri dishes. Film thickness was tailored to meet the demands of various tests by adjusting the initial amount of solution cast into the substrates. Films retained mechanical integrity under ambient conditions until exposed to high temperatures (ca. 100° C.), which led to cPPA depolymerization with concomitant evaporation of the monomer, oPA. The volatile monomer was condensed as a solid on a coldfinger. The recovered monomer was repolymerized by cooling to −78° C. in dichloromethane, treating with $BF_3$, quenching with pyridine, and precipitating from methanol, to complete one cycle or generation. Three full cycles (i.e., four generations of material) have been characterized, and it is expected that this process is indefinitely repeatable.

Thermal depolymerization of cPPA was analyzed chemically by Raman spectroscopy (FIG. 15a). cPPA films (40 µm thickness) were placed on a heated stage maintained at 100° C., and spectra were obtained in real time. Depolymerization was marked by a decrease in the characteristic —COC— peak (1020 cm$^{-1}$) of the acetal backbone. The simultaneous appearance and growth of peaks corresponding to the —C—CHO— (1040 cm$^{-1}$) and carbonyl (1680 cm$^{-1}$) of oPA suggested clean unzipping of cPPA to oPA. After their initial growth, the intensity of peaks at 1040 and 1680 cm$^{-1}$ began to decrease, indicating evaporation of the monomer. Eventually, the Raman signal was lost, marking complete depolymerization and monomer evaporation.

Figure 15:
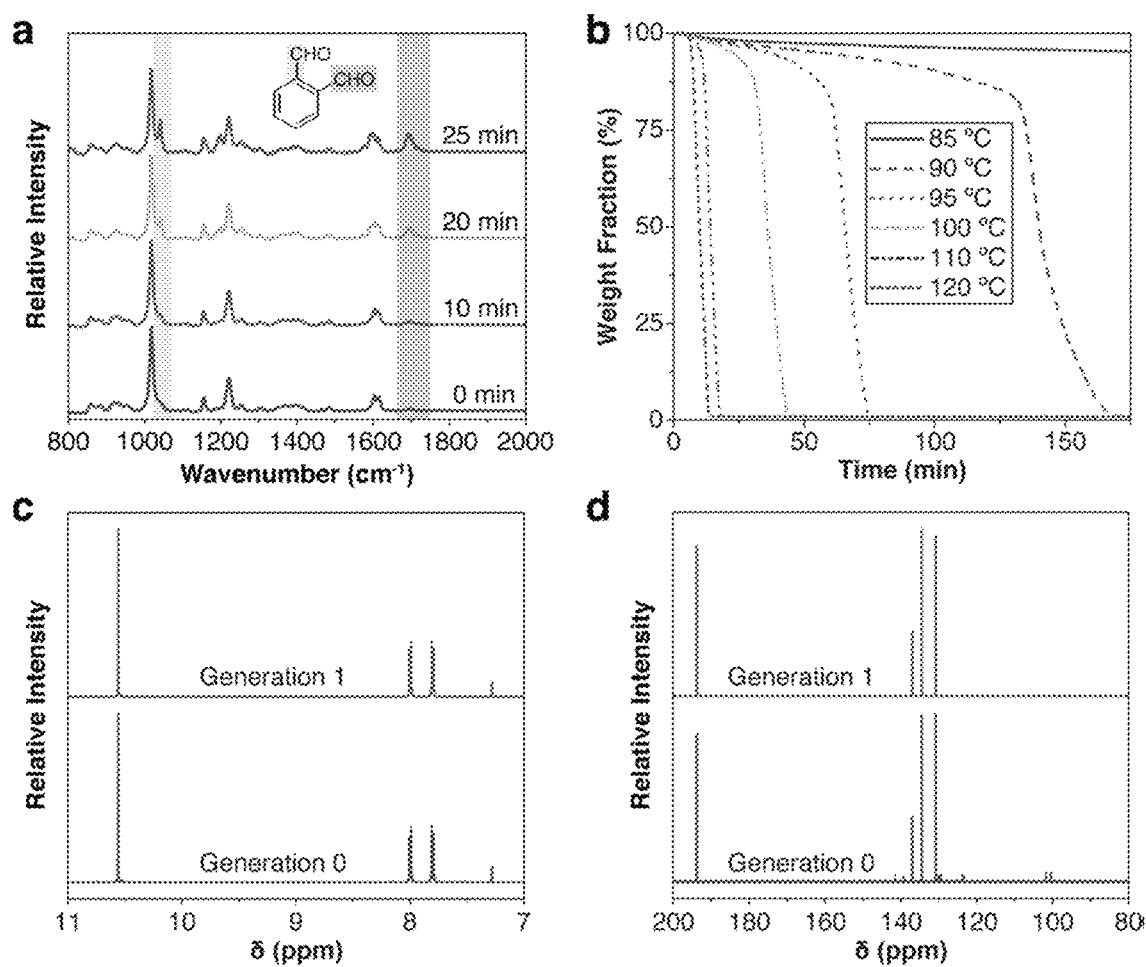
FIG. 15. Chemical characterization of thermally initiated cPPA depolymerization and purity of recovered oPA. (a) Raman spectra, collected in real time, of a cPPA film heated at 100° C. (b) Isothermal TGA traces of cPPA films. (c)$^1$H (500 MHz, $CDCl_3$) and (d) $^{13}$C (500 MHz, DMSO-$d_6$) NMR spectra of virgin (generation 0) oPA and oPA recovered during cPPA thermal depolymerization (generation 1).

Thermal gravimetric analysis was employed to monitor the depolymerization and monomer evaporation phenomena in 40 μm thick cPPA films and determine the optimal recycling conditions (FIG. 15b). Minimal mass loss (4.6 wt %) was observed during a 3 h isotherm at 85° C. MS analysis of the gases evolved during the isotherm showed that the mass loss was attributable to residual chloroform (base peak: m/z 83) from solvent casting instead of oPA formation. The $^1$H NMR spectrum of the film remaining in the TGA pan was characteristic of cPPA and free of any oPA signatures, suggesting minimal cPPA depolymerization. There was a small shift in the GPC trace after the 3 h isotherm, and the polymer exhibited only a minor (6.4%) decrease in molecular weight. These findings indicate that cPPA is stable for extended periods of time at temperatures as high as 85° C., providing a large temperature window for material applications.

Complete mass loss (<1 wt % residue) was observed during 3 h isotherms at temperatures ≥90° C. (FIG. 15b). In each TGA trace above 85° C., a plateau region prior to the onset of rapid mass loss was observed. The gases evolved during the plateau region were confirmed to be residual chloroform. Modest increases in temperature significantly decreased the duration of the plateau region. The onset time, determined via the intersection of tangents to the plateau region and the linear region of rapid mass loss, decreased from 130.5±2.9 to 59.2±0.9 min by increasing the temperature from 90 to 95° C. Further increasing the temperature to 120° C. reduced the onset time to 7.0±0.3 min. The onset of rapid mass loss coincided with the appearance of oPA signals (molecular ion peak: m/z 134) in MS analyses of the gases evolved during TGA traces.

After the onset of degradation, the weight fraction decayed linearly. Assuming zero-order kinetics, rate constants were obtained by applying a linear fit to the region of rapid mass loss. Depolymerization with concomitant monomer evaporation accelerated with temperature according to Arrhenius kinetics. A linear fit of the Arrhenius relationship provided an apparent activation barrier of 13.4 kcal/mol for the coupled process. The relatively small activation barrier for cPPA depolymerization and subsequent oPA evaporation is in great contrast to the thermal degradation of traditional thermoplastics. Polyolefins such as polypropylene, polystyrene, and high-density polyethylene have pyrolysis activation barriers of 43, 47, and 57 kcal/mol, respectively. These high activation barriers lead to thermal degradation onsets in excess of 300° C. and a marked increase in the energy required for recycling.

Aside from the steep energetic barriers, recycling traditional thermoplastics remains challenging due to the formation of complex small molecule mixtures during polymer degradation. The desired monomer preferably should be separated from the mixture in pure form to obtain high quality materials upon repolymerization.

During the depolymerization of cPPA in a sublimation apparatus under moderate vacuum (0.1 Torr), the white, fibrous polymer rapidly transformed into a yellow liquid that boiled as it was formed. Facile condensation of the volatile product as a solid was possible with a coldfinger maintained at 20° C. The yellow crystalline solid was confirmed to be oPA by $^1$H NMR. Comparison of $^1$H (FIG. 15c) and $^{13}$C (FIG. 15d) NMR spectra of the recovered (generation 1) oPA with that of oPA recrystallized directly after purchase (generation 0) suggested that generation 1 oPA was of sufficient quality to permit direct repolymerization. Interestingly, the purity of recycled oPA was greater than generation 0 oPA. Trace impurities were detected by $^{13}$C NMR in generation 0 oPA, and polymerization of this monomer generated 70 kDa polymer. Synthesis of higher molecular weight generation 0 cPPA (as high as 201 kDa) was possible when the monomer was recrystallized an additional time. In contrast, no impurities were detected by $^{13}$C NMR in generation 1 oPA, and polymerization of recycled monomer yielded recycled polymer with comparable or even higher molecular weight than generation 0 cPPA. Recycled cPPA exhibited number-average molecular weights as high as 270 kDa.

Figure 16:
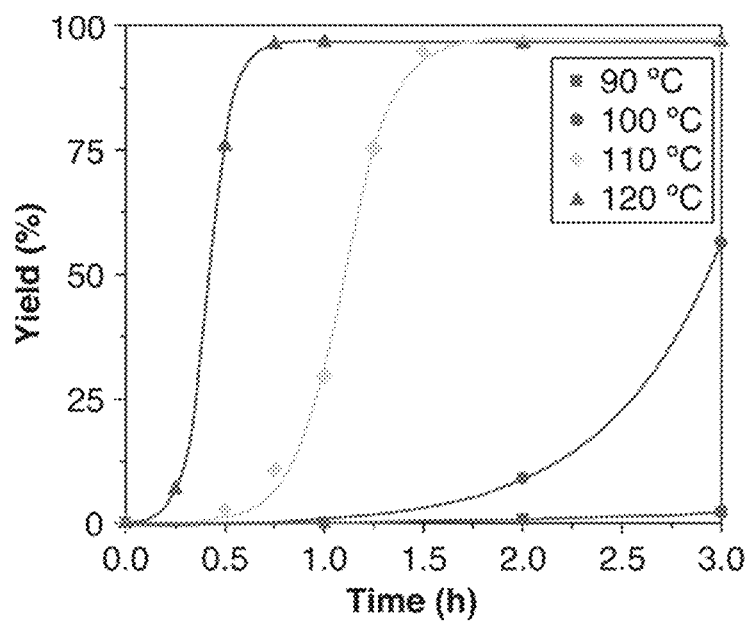
FIG. 16. Time-dependent oPA yields during depolymerization of cPPA in a sublimator maintained at 0.1 Torr and the specified temperatures. Presented values were corrected to account for residual solvents in the starting polymer. Solid lines represent sigmoidal fits of the obtained experimental data.

The recovery of the monomer at varied depolymerization temperatures is demonstrated in FIG. 16. Consistent with observations during TGA experiments, an initial dwell time was followed by the rapid and complete depolymerization of the polymer and evaporation of the monomer. It was found that oPA was recovered quantitatively, within experimental limits, on the coldfinger of the sublimator (97% yield). Quantitative recovery of oPA was possible within 0.75 h at 120° C. and 1.5 h at 110° C. (FIG. 16). Depolymerization times were extended to 20 h to achieve quantitative monomer recovery at 90° C., a significant increase in time given the relatively small change in temperature. The time-temperature relationship shown here demonstrates the feasibility of tailored recovery processes.

Figure 17:
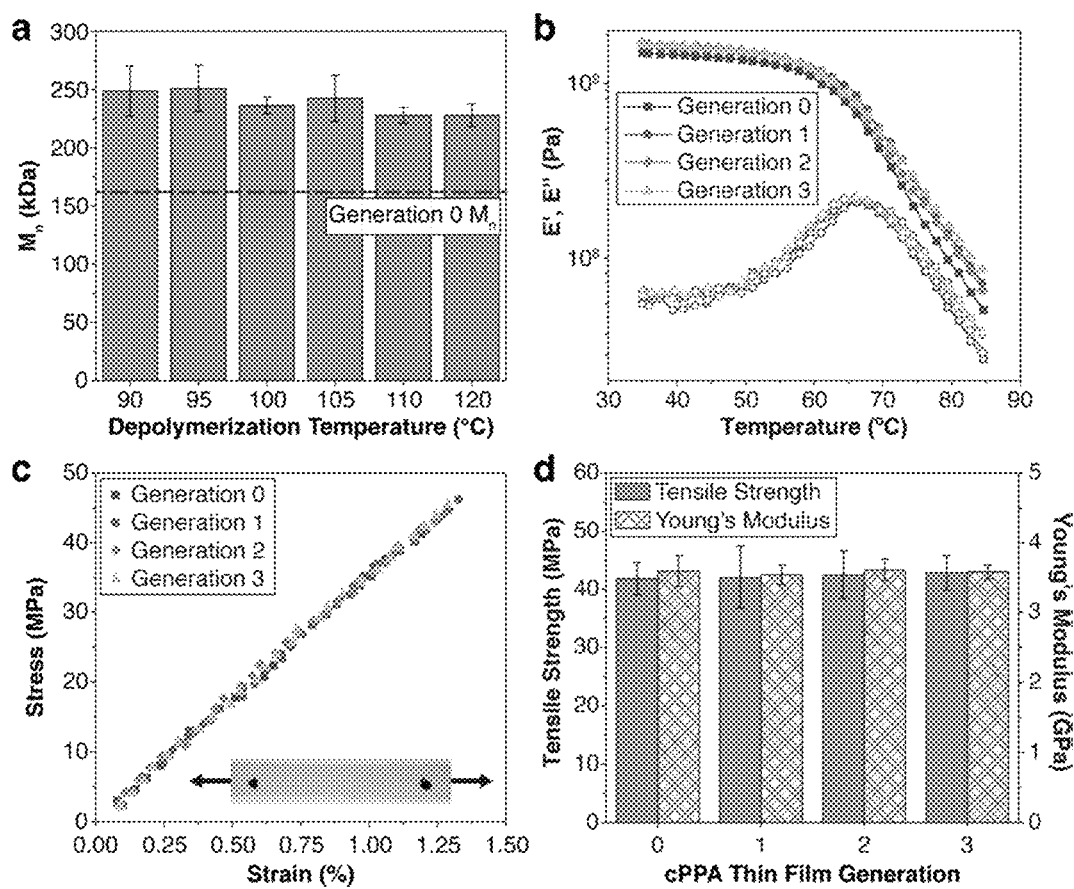
FIG. 17. Evaluation of the chemical and mechanical properties of virgin and recycled materials. (a) Number-average molecular weight (Mn) of generation 1 cPPA created following the depolymerization of generation 0 cPPA at the specified temperature. Reported values and error bars represent the average and one standard deviation, respectively (n=3). The red dashed line represents generation 0 cPPA molecular weight. (b) Representative thermomechanical responses of virgin and recycled cPPA films determined via dynamic mechanical analysis. The storage modulus is represented by solid symbols, and the loss modulus is represented by open symbols. (c) Representative stress-strain curves for cPPA thin films under quasi-static tensile loading (inset represents an example cPPA thin film with points applied for the virtual extensometer; distance between virtual extensometer points was maintained at 25 mm; arrows indicate the loading direction). (d) Mechanical properties of virgin and recycled cPPA thin films. Reported values and error bars represent the average and one standard deviation, respectively (n=5).

The molecular weight of recycled cPPA was found to be independent of the temperatures used to depolymerize virgin polymer in this study (FIG. 17a). To ensure sufficient monomer recovery, all depolymerizations were performed at the given temperatures until no polymer remained in the bottom vessel of the sublimation apparatus (between 0.75 and 20 h). Depolymerizations conducted at 90 and 120° C. allowed for the synthesis of recycled polymer with Mn=248±21 and 228±10 kDa, respectively. For all utilized depolymerization temperatures, any differences in recycled polymer molecular weight were negligible at the 95% confidence level.

Given that materials typically suffer a reduction in properties during traditional recycling processes, the mechanical properties of virgin and recycled cPPA were assessed with DMA and quasi-static tension (FIG. 17b-d). cPPA thin films (120 μm thickness) were prepared for DMA by drop casting in a chloroform-saturated environment, which slowed the solvent evaporation rate, ensuring uniform thickness and defect-free films. The films were dried undisturbed in the saturated environment for 18 h, dried in vacuo (0.1 Torr) for 24 h at room temperature, and subsequently annealed at 70° C. for 30 min to remove any residual stress from solvent casting. The thin films were subjected to dynamic temperature sweeps under oscillatory load up to a maximum temperature of 85° C. The films showed no signs of depolymerization during DMA experiments. The tested films were recycled by heating to 120° C. for 1 h in vacuo, polymerizing the collected monomer, and solvent casting the resulting polymer. This process was repeated until three generations of recycled films were prepared and tested. FIG. 17b demonstrates the similarities in viscoelastic properties of virgin and recycled cPPA films. All four generations of polymer films exhibited experimentally identical storage moduli at 35° C. (1.6±0.1 GPa). The films remained in glassy regimes until transition temperatures of ca. 65° C. were reached—the glass transition temperatures for each generation were identical at the 95% confidence level.

To obtain specimens of the fidelity required for thin film tensile testing, a tape casting method was utilized in lieu of drop casting. cPPA/chloroform (125 mg cPPA/mL chloroform) solutions were poured onto an ultrahigh-molecular-weight polyethylene substrate, and the thickness of the film was set with a high precision film applicator. As in the drop casting procedure, films were then dried undisturbed for 18 h in a chloroform saturated environment, dried in vacuo (0.1 Torr) at room temperature for 24 h, and annealed at 70° C. Films were tested under quasi-static tensile loading until failure and then recycled. The similarities in the stress-strain response and bulk properties of generation 0-3 cPPA films are evident in FIG. 17c,d. All tested cPPA films deformed elastically under tensile loading until brittle failure at ~1.2% strain. Impressively, generation 0 cPPA demonstrated a modulus (3.6 GPa) and tensile strength (41.9 MPa) comparable to industry standard thermoplastics such as polystyrene, poly(ethylene terephthalate), and high-density polyethylene. Virgin and recycled cPPA films possessed experimentally identical Young's moduli (3.6±0.1 GPa), and the films retained at least 100% of the original tensile strength through three depolymerization and repolymerization cycles. Any differences in properties among generations were negligible at the 95% confidence level. Thermally mediated cPPA recycling represents the first approach to low Tc polymer recycling which retains both chemical and mechanical properties of the polymer.

Figure 18:
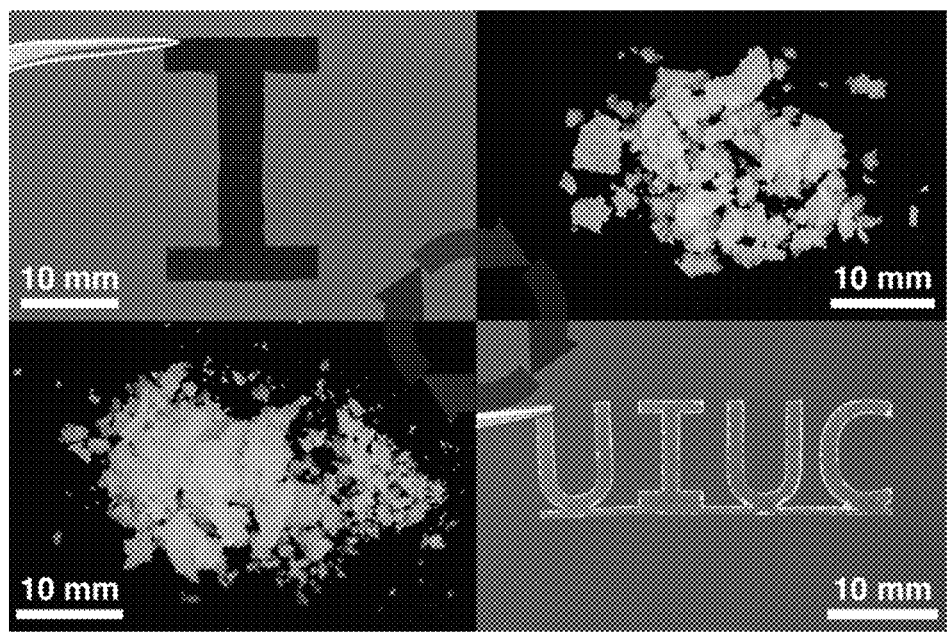
FIG. 18. Photographs of solvent cast cPPA films (dyed with methylene blue or Astrazon Orange R during the casting process and laser cut into specified shapes for visualization) and the monomer (oPA) collected following depolymerization of the dyed films. The dyed films are held by metal tweezers. Arrows represent polymerization and film casting, or depolymerization and monomer collection.

The presence of dyes and other additives in plastics poses an additional challenge during recycling. Traditional polymers must be separated from other plastics and additives prior to recycling. Impurities in the recycling stream often result in mechanical defects, discoloration, or undesirable odors which diminish the value of the recycled product. In contrast, cPPA processed with various dyes was successfully recycled without first removing the dye (FIG. 18). A blue cPPA film was generated by adding 2.5 wt % (vs cPPA) methylene blue into a cPPA/chloroform solution prior to solvent casting. The resulting film was laser cut into an I as shown in FIG. 18 (top left) and subsequently depolymerized at 120° C. oPA (top right) was collected (97% yield) without any trace of methylene blue as confirmed by 1H NMR spectroscopy, and methylene blue remained at the bottom of the sublimation apparatus. Polymerization of the recovered oPA yielded 241 kDa polymer. The resulting cPPA was solvent cast with 2.5 wt % Astrazon Orange R, and the orange film was laser cut into the UIUC logo shown in FIG. 18 (bottom right). Depolymerization of the orange film generated oPA (bottom left) that was free of Astrazon Orange R, and polymerization of this monomer produced 238 kDa cPPA. We anticipate that cPPA will be recyclable in the presence of a variety of additives (dyes, plasticizers, fillers, etc.), and the simplicity of direct repolymerization will be maintained provided that the additives do not produce volatile products at cPPA depolymerization temperatures. This feature offers a solution to a key problem in FRPC recycling: removal of the polymer matrix without damaging the fiber reinforcement.

When utilizing conventional FRPC recycling strategies such as pyrolysis or solvolysis, the polymer matrix is fully oxidized or decomposed to secondary value chemicals at temperatures in excess of 200° C., enabling reclamation of the fibers. However, because of the stability of the polymer matrix and severity of degradation conditions, the fibers are typically recovered in a damaged state. Mild degradation conditions (i.e., low pyrolysis temperatures) do not allow for complete removal of the matrix. Reclaimed fibers are typically encased in a large amount of residual resin, limiting the possibility of successful reimpregnation with matrix resin. Harsh degradation conditions, on the other hand, result in fibers that suffer from severe pitting and surface defects which cause significant decreases in fiber strength. In either case, the value of the reclaimed fibers is significantly diminished. The ability to completely depolymerize cPPA and volatilize oPA under mild conditions (temperatures as low as 90° C.) allows for both complete matrix removal and fiber property retention when recycling.

Figure 19:
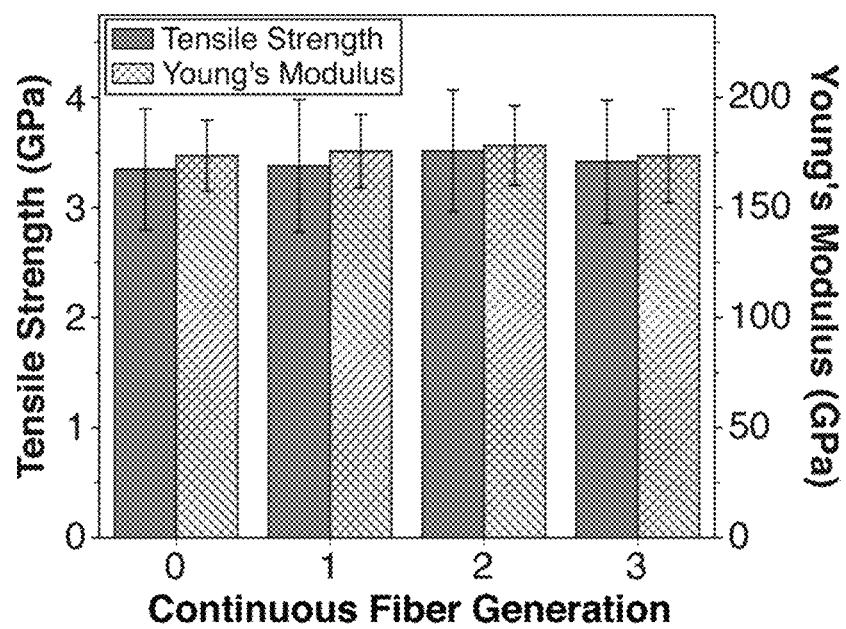
FIG. 19. Mechanical properties of virgin and recycled continuous carbon fibers determined via single fiber tension. Reported values and error bars represent the Weibull mean and variance, respectively (n≥50).

The properties of carbon fibers reclaimed after depolymerization of cPPA matrices were evaluated by SEM and single fiber tension (FIG. 19). For ease of analysis, continuous carbon fibers were considered. Composites were prepared by solvent casting cPPA in the presence of a single tow of continuous fibers. The resulting films were heated in vacuo at 120° C. for 1 h to depolymerize the matrix and recover the fibers. Casting and depolymerization were repeated until generation 3 samples were acquired. A qualitative evaluation of the fiber morphology and the amount of residual matrix was obtained with SEM. Fibers were reclaimed nearly free of residue. TGA analysis confirmed <0.6% of the mass of starting polymer in a film remained on the fibers after depolymerization at 120° C. for 1 h. It was anticipated that any residues, which are likely small molecules, are easily removable with organic solvents. Additionally, reclaimed fibers showed no evidence of surface defects or pitting, a result of the mild depolymerization conditions. The mechanical integrity of the reclaimed fibers was determined via single fiber tensile tests (FIG. 19). All reclaimed fibers were found to retain their original strength and stiffness, and any deviations were negligible at the 95% confidence level. The excellent property retention and minimal matrix residue suggest that these reclaimed fibers will exhibit exceptional performance when reused.

Figure 20:
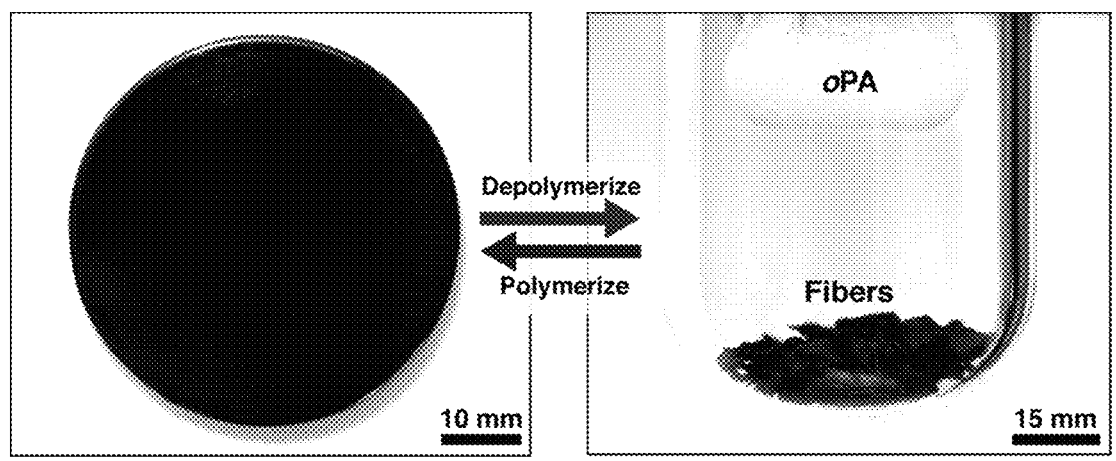
FIG. 20. Photographs of a cPPA/CNF composite film (left) and sublimation apparatus after heating the composite film to 120° C. for 1 h (right). Depolymerization is achieved by heating in vacuo (0.1 Torr) at ca. 100° C. The film is recovered after repolymerization and solvent casting from chloroform.
Figure 21:
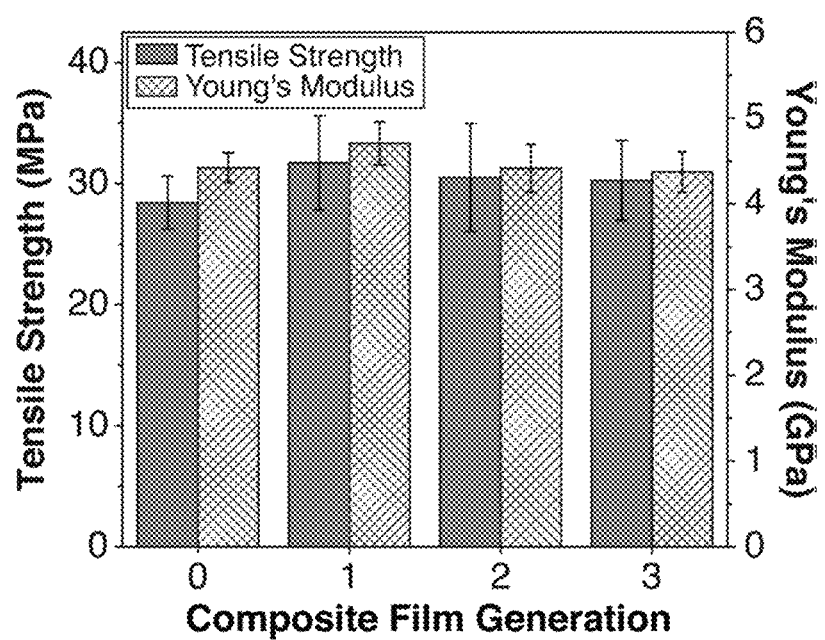
FIG. 21. Mechanical properties of virgin and recycled cPPA/CNF composite films determined via quasi-static tension. Reported values and error bars represent the average and one standard deviation, respectively (n=5 for tensile strength and n=6 for Young's modulus).

Carbon nanofiber-reinforced composite films were prepared to assess the recyclability of cPPA FRPCs by casting chloroform solutions of carbon nanofibers (CNF) and cPPA (0.15 g of CNF, 1 g of cPPA, 0.9 mL of chloroform) with the previously described drop casting and tape casting procedures (FIG. 20, left). The use of carbon nanofiber composites in place of continuous or short fiber composites allowed for characterization of recycled composite films without the bias of fiber damage incurred during mechanical testing. Upon heating the CNF composite films to the desired depolymerization temperature in a sublimation apparatus, the films rapidly disintegrated, and a yellow solid (oPA) was collected on the condenser. oPA was recovered quantitatively within 1 h at 120° C. and 0.1 Torr, and the fibers remained in place, indicating complete separation of the matrix and reinforcement phases (FIG. 20, right). The CNF reinforcement was removed from the lower vessel as flakes of agglomerated fibers that immediately collapsed upon agitation, and the collected oPA (97% yield) was repolymerized directly (Mn=231 kDa). The reclaimed fibers and recycled polymer were cast to make a recycled composite film. The properties of virgin and recycled composite films were compared via quasi-static tension (FIG. 21). The recycled composites exhibited mechanical properties that were experimentally identical to the virgin composite. All four generations exhibited moduli of 4.5±0.3 GPa and tensile strengths of 30.3±3.5 MPa. The recycled composites were found to retain at least 100% of the original tensile strength and at least 99% of the original modulus; the differences among generations were all negligible at the 95% confidence level. This clearly demonstrates the utility of cPPA for the production of composite materials with facile recycling strategies that yield high value products.

The material system presented here is the first demonstration of a fully recyclable polymeric matrix material with full monomer recovery and retention of polymer chemical and mechanical properties during recycling. cPPA is a model for a new generation of polymers and composites designed for ease of recycling. It has been demonstrated the ability to depolymerize cPPA and quantitatively recover high-purity monomer under mild thermal conditions. Multiple cycles of depolymerization and repolymerization were performed, each yielding polymer with excellent properties. Carbon fiber-reinforced cPPA composites were produced via solvent-casting from chloroform, and the resulting films were recycled without damaging the reinforcement phase or loss in mechanical properties over multiple generations. The presented process, which relies solely on a thermal stimulus, is easily scalable. Efficient scaling will require optimization of heat transfer during depolymerization and of monomer condensation. Thermally mediated recycling of cPPA is not limited to fiber-reinforced composite materials but will likely find use in the electronics and consumer product industries as well. The development of polymers capable of undergoing an indefinite number of depolymerization and repolymerization cycles in response to specific environmental stimuli (e.g., temperature) not only impacts recyclability but also opens new opportunities for selfhealing and environmentally adaptive materials.

Example 13. Oxidative Degradation of cPPA

Figure 22:
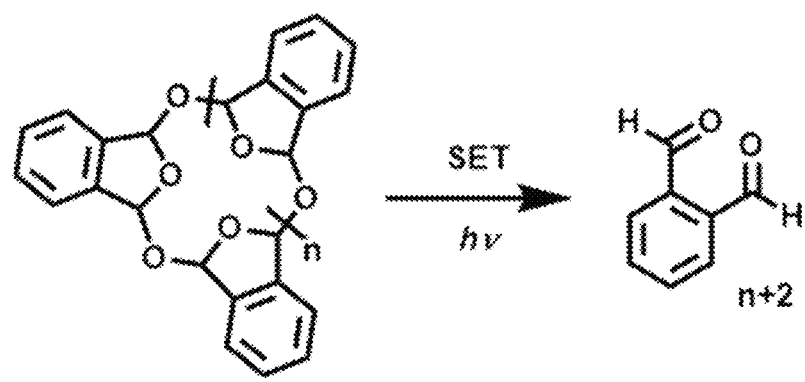
FIG. 22. Simplified reaction scheme showing depolymerization of cyclic poly(phthalaldehyde) upon single electron transfer (SET) oxidation.

Cyclic poly(phthalaldehyde) (cPPA) can be induced to depolymerize by a process of single electron transfer (SET) oxidation, wherein removal of a single electron from the polymer backbone results in the unzipping of the polymer chain. The general reaction scheme is shown in FIG. 22. Degradation of cPPA by the introduction of small molecule chemical oxidants and by photolysis in the presence of photochemical oxidants was studied.

Solution Phase Degradation Using Chemical Oxidants

Figure 23:
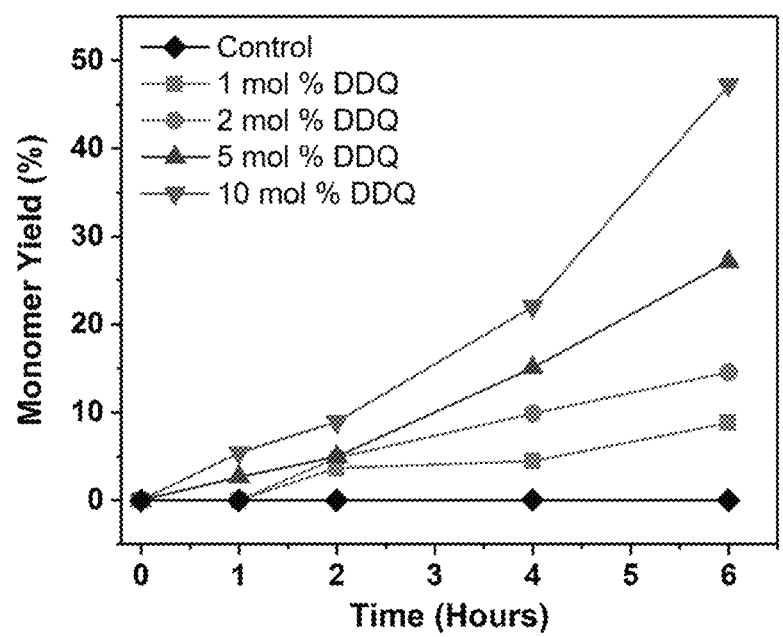
FIG. 23. Single electron transfer-triggered degradation of cyclic poly(phthalaldehyde) induced by the chemical oxidant 2,3-dichloro-5,6-dicyanobenzoquinone (DDQ) in methylene chloride solution. Formation of monomer was monitored by gel permeation chromatography and shows dose-dependence on the oxidant.

In solution, it was shown that cPPA can be degraded by the introduction of chemical oxidants and shows dose-dependent behavior, where higher concentrations of oxidizing species resulted in faster depolymerization. In one experiment, a 10 mg/mL solution of cPPA in DCM was prepared, and varying concentrations of the oxidant 2,3-dichloro-5,6-dicyanobenzoquinone (DDQ) were added. The solutions were stored at room temperature, and aliquots were removed periodically for GPC analysis. As measured by GPC (FIG. 23) the sample with no added oxidant did not appreciably degrade over the course of this experiment (by the formation of monomer). Conversely, samples with added oxidant showed dose- and time-dependent degradation behavior. Over the span of 6 hours, the sample with the highest concentration oxidant (10 mol %) showed roughly 50% conversion to monomer. This indicates that solution phase degradation of cPPA using chemical oxidants is facile and tunable.

Solid Phase Destabilization of cPPA Using Chemical Oxidants

Incorporation of small molecule oxidants into solid cPPA has also been realized. Due to the time required for solvent blending, addition of strong oxidants such as DDQ is not feasible, as significant degradation occurs during the ca. 12 hour drying process (see FIG. 23). However, more mild oxidants that do no induce significant degradation at ambient temperatures can be incorporated into the cPPA matrix. One such example is chloranil.

Figure 24:
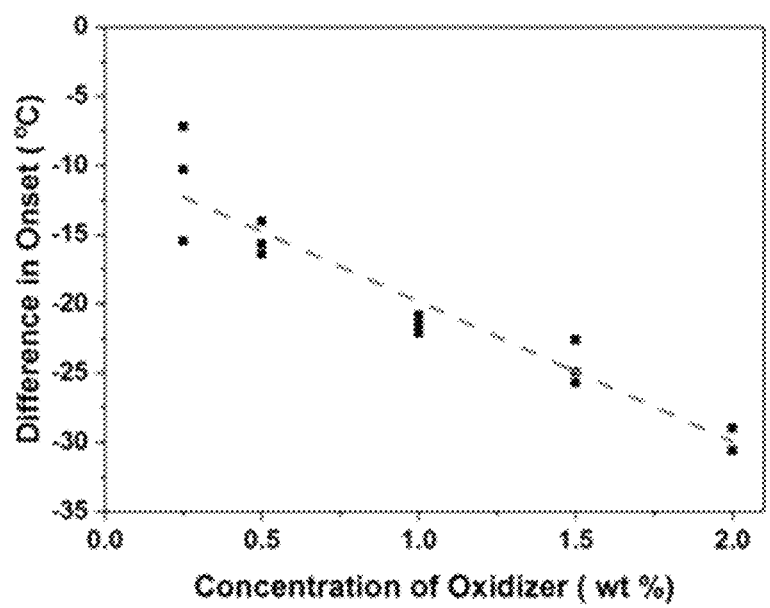
FIG. 24. Oxidative destabilization of cyclic poly(phthalaldehyde). Change in degradation onset temperature relative to un-doped material is plotted versus the concentration of a small molecule chemical oxidant. The dose dependent destabilization provides a method to tune thermal degradation behavior.

Films of cPPA were prepared, and varying concentrations of chloranil, a mild oxidant, were added during the solvent blending process, ranging from 0.25 to 2.0% by weight. Addition of the oxidizer did not adversely affect the production of films up to 20% by weight additive. However, the thermal degradation of the polymeric material was significantly impacted. Shown in FIG. 24 is the change in degradation onset temperature (Td) in cPPA films with varying chloranil loadings. The plotted data are the onsets measure by tangent intersections of thermogravimetric analysis (TGA) traces collected during 5° C./min dynamic TGA experiments.

Notably, the Td decreases by approximately 30° C. at 2% chloranil loading, while the plot overall shows roughly linear dose dependence. This provides access to tunable thermal degradation behavior in cPPA without adversely affecting material quality. Such has not been previously achieved.

Photodegradation of cPPA in Solution

SET-induced degradation of cPPA has also been realized through photochemical oxidation. This can be achieved by using most available photooxidants.

Figure 25:
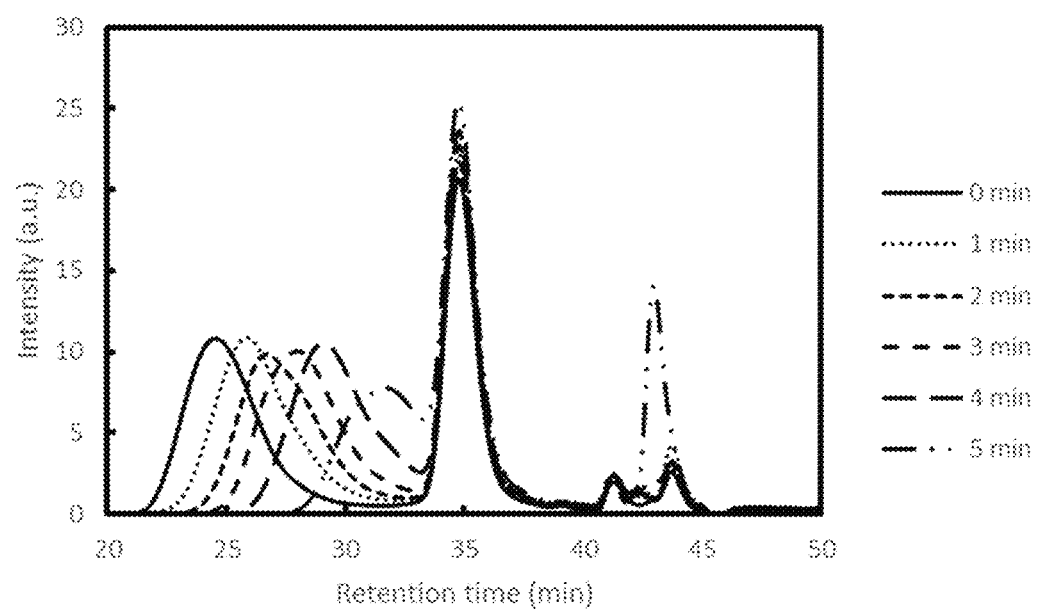
FIG. 25. Single electron transfer degradation of cyclic poly(phthalaldehyde) by the photooxidant N-methylquinolinium hexafluorophosphate during 365 nm UV irradiation. Degradation was monitored by gel permeation chromatography and shows significant formation of low molecular weight polymer as well as small molecules.

One example of this degradation in solution is shown in FIG. 25. Here, N-methylquinolinium hexafluorophosphate (NMQPF6) was used as a photooxidant. Solutions of cPPA in DCM (10 mg/mL) were prepared with ca. 1 mg/mL NMQPF6. On exposure to UV light (365 nm, ca. 300 mW/cm$^2$), GPC analysis shows substantial degradation of the polymer over the time course of the experiment. Depolymerization is concomitant with the generation of low molecular weight polymer, oligomer, and small molecules. Control samples of the cPPA/NMQPF6 solution that were unexposed to UV light did not show degradation, while sample exposed to UV light in the absence of NMQPF6 showed low degrees of depolymerization, likely due generation of small amounts of acid in DCM during photolysis.

Photodegradable Bulk Materials

Manufacture of the bulk solids follows the same procedure described herein: cPPA was dissolved in DCM and blended with a plasticizer and a photooxidant, then drop cast in a dark enclosure and allowed to dry into a mechanically-robust film. The film was then mechanically ground into a feedstock which is then used to thermoform bulk solids as described above.

Figure 26:
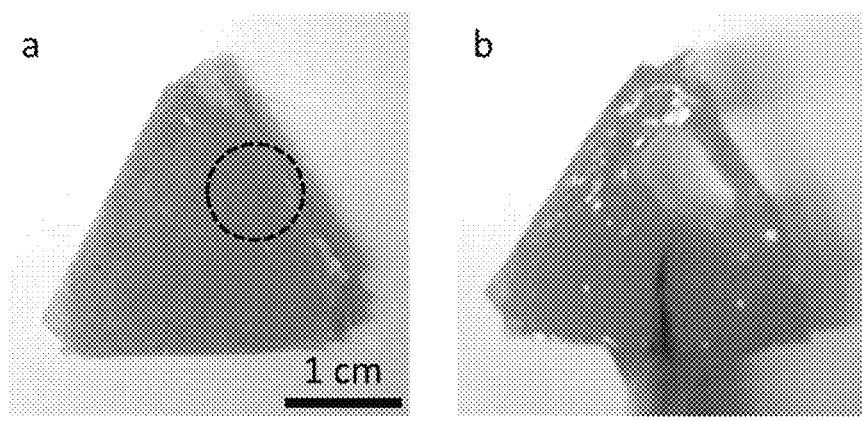
FIG. 26. Photoinduced degradation of a bulk cyclic poly (phthalaldehyde) specimen on exposure to broad spectrum white light with 0.1 phr 9,10-dicyanoanthracene included as a photooxidant. Sample was irradiated for 60 seconds at an irradiance of 1 W/cm².

In the incarnation shown in FIG. 26, cPPA was blended with 20 phr of the plasticizer diethylphthalate and 0.1 phr of the photooxidant 9,10-dicyanoanthracene (DCA). Hot press thermoforming of the materials at 100° C. and 100 kPa for 15 minutes afford the bulk solid shown in FIG. 26a. Samples containing photooxidant generally exhibit mechanical chemical properties identical to cPPA formulations without photooxidants, excluding the photosensitivity. In this example, broad spectrum white light from a mercury lamp was used to excite the DCA incorporated in the polymer matrix and induce degradation. As can be seen in the photograph (FIG. 26b), the area of irradiation, outline by the black circle in FIG. 26a, is completely degraded in the course of one minute of irradiation at 1 W/cm$^2$.

All of the methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a stabilizer" is intended to include "at least one stabilizer" or "one or more stabilizers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

The invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Furthermore, the advantages described above are not necessarily the only advantages of the invention, and it is not necessarily expected that all of the described advantages will be achieved with every embodiment of the invention.

The invention claimed is:

1. A composition, comprising:
cyclic poly(phthalaldehyde) (cPPA);
a Lewis acid catalyst in an amount of less than about 10 µmol/g; and
a plasticizer.

2. The composition of claim 1, wherein the Lewis acid catalyst is titanium tetrachloride, boron trifluoride, tin(IV) chloride, aluminum chloride, zinc chloride, an alkyl aluminum. chloride, or any combination thereof.

3. The composition of claim 1, wherein the plasticizer is selected from the group consisting of: dimethylphthalate, diethylphthalate, dibutylphthalate, dihexylphthalate, dioctylphthalate, an arene, a long-chain alkyl ether, and any combination thereof.

4. The composition of claim 1, further comprising a stabilizer comprising at least one of an arene, a long-chain alkyl ether, a sacrificial reductant, an organic base, a nucleophile, pyridine, an alkylamine, or an alcohol.

5. The composition of claim 1, further comprising a stabilizer selected from one or more of anisole; 1,4-dimethoxybenzene; 1,3,5-trimethoxybenzene, 1,2,4-trimethoxybenzene; diphenyl ether; biphenyl, aniline; or any other organic compound with an oxidation potential lower than that of cPPA.

6. The composition of claim 1, further comprising a stabilizer selected from the group consisting of: (2,2,6,6 tetramethylpiperidin-1-yl)oxyl (TEMPO), N,N'-di-sec-butyl-1,4-phenylenediamine (DBPDA), and any combination thereof.

7. The composition of claim 1, wherein the cPPA degrades when contacted by an acid or exposed to a temperature of about 120 to about 200° C.

8. The composition of claim 7, wherein the acid comprises a strong mineral or an organic acid.

9. The composition of claim 7, wherein the acid comprises one or more of hydrochloric acid, sulfuric acid, acetic acid, or trifluoroacetic acid.

10. A bulk transient material, comprising the composition of claim 1 and a photooxidant.

11. A device made at least in part from the composition of claim 1.

12. A method for stabilizing cyclic poly(phthalaldehyde) (cPPA) to enable thermal processing of a bulk solid, the method comprising:
purifying cPPA by lowering a concentration of a Lewis acid catalyst to less than about 10 µmol/g; and
adding a plasticizer to the cPPA.

13. The method of claim 12, wherein the purifying of cPPA comprises dropwise precipitation of the cPPA into a solvent, resulting in a purified cPPA having a concentration of the Lewis acid catalyst of less than about 10 µmol/g.

14. The method of claim 12, further comprising adding a stabilizer to the cPPA.

15. A method of manufacturing a bulk transient material capable of triggered depolymerization, the method comprising:
purifying cyclic poly(phthalaldehyde) (cPPA) by lowering a concentration of a Lewis acid catalyst to less than about 10 µmol/g;
dissolving the purified cPPA in a first portion of a solvent to form a purified cPPA solution;
dissolving a plasticizer in a second portion of the solvent to form a plasticizer solution;
mixing the purified cPPA solution with the plasticizer solution to form a mixture;
casting the mixture into a film to obtain a cPPA film;
drying the cPPA film;
melting the dried cPPA film;
adding the melted cPPA into a mold;
cooling the melted cPPA to solidify the cPPA; and
removing the solidified cPPA from the mold to obtain a bulk transient material capable of triggered depolymerization.

16. The method of claim 15, further comprising dissolving a stabilizer in the second portion of the solvent with the plasticizer.

17. The method of claim 15, further comprising dissolving an oxidant or a photooxidant in the second portion of the solvent.

18. A method of recycling a material comprising cyclic poly(phthalaldehyde)(cPPA), comprising:
heating the material comprising cPPA to a temperature at or above a depolymerization temperature of the cPPA so as to provide degraded cPPA; and
recovering monomers from degraded cPPA.

19. The method of claim 18. wherein the heating the material is conducted under vacuum.

20. The method of claim 18, wherein the material further comprises a fiber.

* * * * *

UNITED STATES PATENT AND TRADEMARK OFFICE
CERTIFICATE OF CORRECTION

PATENT NO.        : 11,111,378 B2                      Page 1 of 1
APPLICATION NO.   : 16/383316
DATED             : September 7, 2021
INVENTOR(S)       : Jeffrey S. Moore et al.

It is certified that error appears in the above-identified patent and that said Letters Patent is hereby corrected as shown below:

In the Claims

Column 26, Claim 19, Line 52, after "claim 18", delete ".", and insert in its place --,--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*